US009555820B2

(12) United States Patent
Ende et al.

(10) Patent No.: US 9,555,820 B2

(45) Date of Patent: Jan. 31, 2017

(54) ELECTRICAL CONTACT COUPLING FOR A TRACK-BORNE VEHICLE

(71) Applicant: Voith Patent GmbH, Heidenheim (DE)

(72) Inventors: Sascha Ende, Eschershausen (DE); Andreas Heinisch, Vordorf/Rethen (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 14/910,728

(22) PCT Filed: Aug. 6, 2014

(86) PCT No.: PCT/EP2014/066896

§ 371 (c)(1),
(2) Date: Feb. 8, 2016

(87) PCT Pub. No.: WO2015/018862

PCT Pub. Date: Feb. 12, 2015

(65) Prior Publication Data

US 2016/0185364 A1 Jun. 30, 2016

(30) Foreign Application Priority Data

Aug. 7, 2013 (DE) ........................ 10 2013 108 515
Jul. 29, 2014 (DE) ........................ 10 2014 110 676

(51) Int. Cl.
*H01R 13/44* (2006.01)
*B61G 5/10* (2006.01)
(Continued)

(52) U.S. Cl.
CPC . *B61G 5/10* (2013.01); *B60D 1/00* (2013.01); *B60D 1/64* (2013.01); *H01R 13/44* (2013.01)

(58) Field of Classification Search
CPC ............. B61G 5/10; H01R 13/44; B60D 1/00; B60D 1/64
(Continued)

(56) References Cited

U.S. PATENT DOCUMENTS 1,223,222 A * 4/1917 Tomlinson et al. .... H01R 13/70 200/51 R
1,349,405 A * 8/1920 Brown ..................... B61G 5/10 200/51.09

(Continued)

FOREIGN PATENT DOCUMENTS

CH 424 906 A 11/1966
EP 0 982 215 B1 10/2004

(Continued)

*Primary Examiner* — Jean F Duverne
(74) *Attorney, Agent, or Firm* — Cesari and McKenna, LLP

(57) ABSTRACT

The present invention relates to an electrical contact coupling (10) for a track-borne vehicle, wherein the electrical contact coupling (10) comprises a coupling housing (11) having at least one frontal housing opening (23, 33). In order to achieve the current or data-carrying cables of the electrical contact coupling (10) not needing to move relative to the electrical contact coupling (10) when said electrical contact coupling (10) is being coupled and thus reduce the mechanical wear on the external current or data-carrying cables/cable harnesses which realize a relative movement to the coupling during the coupling process, the invention provides for a first contact holder (20) having a plurality of electrical contacts (32) to be arranged in the coupling housing (11) as well as a contacting support (40) having a plurality of contact tabs (42). The contacting support (40) is displaceable in the longitudinal direction of the coupling housing (11) relative to said coupling housing (11) from a first position, in which the contacting support (40) with the contact tabs (42) is completely accommodated within the coupling hous- (Continued)

ing (11), into a second position in which at least the front end region of the contacting support (40) protrudes from the housing opening (23, 33).

20 Claims, 24 Drawing Sheets

(51) Int. Cl.
*B60D 1/64* (2006.01)
*B60D 1/00* (2006.01)

(58) Field of Classification Search
USPC .......................................................... 439/132
See application file for complete search history.

(56) References Cited

U.S. PATENT DOCUMENTS

| | | | | |
|---|---|---|---|---|
| 3,678,442 A | | 7/1972 | Cope et al. | |
| 3,812,444 A | * | 5/1974 | Reno | B61G 5/10 213/1.3 |
| 4,531,799 A | * | 7/1985 | Gray | G01R 1/073 439/298 |

FOREIGN PATENT DOCUMENTS

| | | |
|---|---|---|
| EP | 1 826 093 A1 | 8/2007 |
| EP | 2 431 201 A1 | 3/2012 |

* cited by examiner

100

ELECTRICAL CONTACT COUPLING FOR A TRACK-BORNE VEHICLE

CROSS REFERENCE TO RELATED APPLICATIONS

This application is the National Stage of International Application No. PCT/EP2014/066896, filed on Aug. 6, 2014, which claims priority to German Application No. 10 2013 108 515.6, filed on Aug. 7, 2013 and German Application No. 10 2014 110 676.8, filed on Jul. 29, 2014. The contents of both applications are hereby incorporated by reference in their entirety.

The invention relates to an electrical contact coupling for a track-borne vehicle, a railway vehicle in particular.

Electrical contact couplings are generally used in railway vehicle technology to convey control signals and to transmit power between two adjacent car bodies of a multi-member vehicle. The arrangement, control and size of the electrical contact couplings used depend on the available installation space in the vehicle and on the number of signals to be transmitted as well as the requirements of the railcar manufacturer or railway operator respectively.

Electrical contact couplings are usually designed such that two electrical contact couplings are coupled and uncoupled automatically. In the process, the electrical contact couplings arranged on the vehicles or car bodies to be coupled are brought together in precise fashion by centering devices and then pressed together at sealing areas at the front end of the electrical contact couplings so as to achieve reliable sealing against the environment. In the uncoupled state, a protective flap normally covers the front end of the electrical contact coupling to protect the coupling elements or live contact elements of the electrical contact coupling as applicable from contact and contamination.

The electrical contact coupling is usually located on the upper side or on the side of the coupler head of a mechanical coupling and consists of a housing with a flap and a contact holder with front-mounted contacts (pin contacts) for transmitting electrical signals.

Figure 1A:
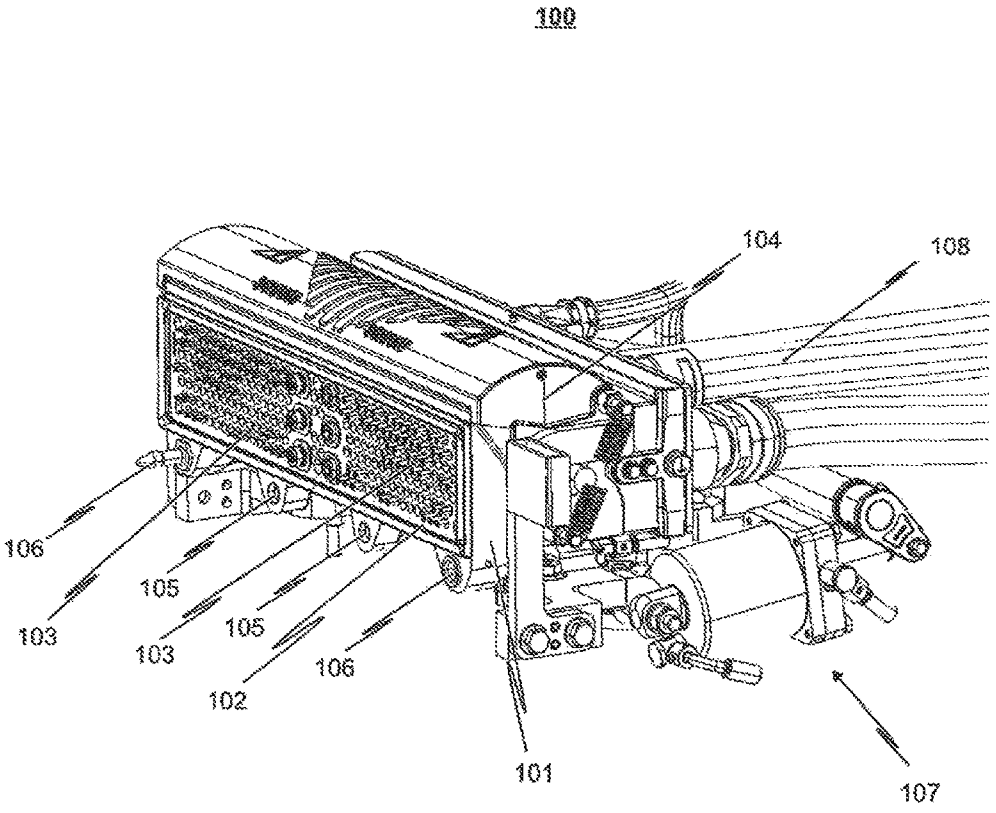
Figure 1B:
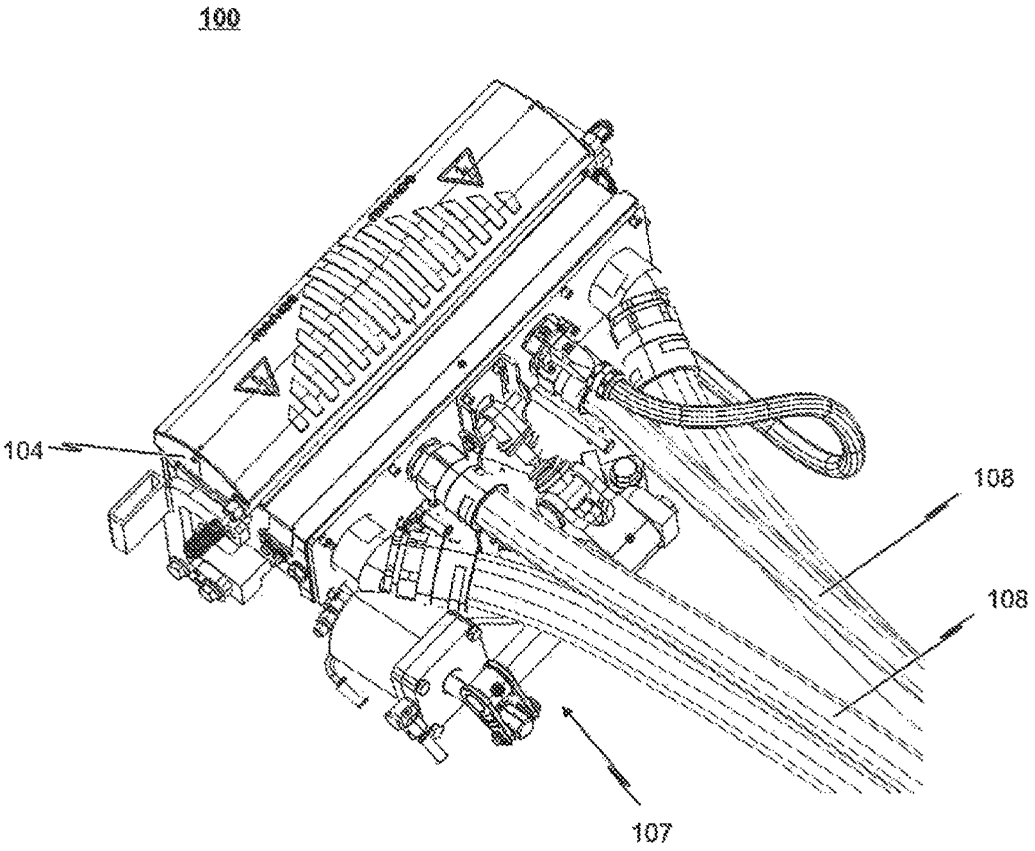
Figure 1C:
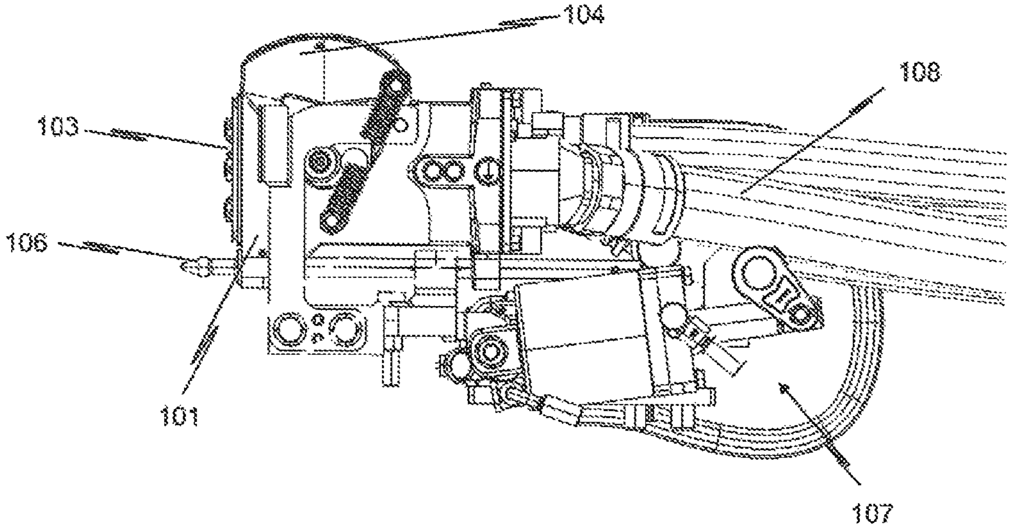

Reference is made in this context to FIGS. 1*a* to 1*c* which depict a known prior art electrical contact coupling 100 as an example, same being shown in its open state such that the contact holder 102 with pin contacts 103 is exposed.

The housing 101 of the electrical contact coupling 100 is rectangular in cross section, whereby guides 105 and frontal centering elements 106 are provided on the exterior side facing the coupler head. The front of the housing 101 of the electrical contact coupling 100 and the contact holder 102 are tightly sealed together. A seal encloses the contact holder 102 at the front. Drill holes in which connector pins are seated are disposed in the contact holder 102, whereby the pin contacts 103 are screwed into the connector pins at the front. The rear of the housing 101 is tightly sealed by a cover. The cable fittings and the drive strap are disposed in the cover.

The flap 104 of the electrical contact coupling 100, which can protect the pin contacts 103 on the contact holder 102 as needed, is pivotably mounted in the front region of the housing 101 of the electrical contact coupling 100. In the uncoupled position, the flap 104 protects the contacts 103 from contamination, water and mechanical damage and prevents persons from accidentally coming into contact with them.

In order to couple the electrical contact couplings 100 of two adjacently arranged car bodes or vehicles, the electrical contact couplings 100 to be coupled are pushed forward relative to the mechanical coupling into the common coupling plane. The centering elements 106 of opposite housings 101 of electrical contact couplings 100 slide into one another and align the housings 101 together. The respective contacts 103 of the electrical contact couplings 100 are thus fit to each other perfectly and the sealing frames are pressed against each other.

When uncoupling, the contacts 103 of the electrical contact couplings 100 are separated again by the electrical contact couplings 100 being pushed to the rear out of the coupling plane.

Each electrical contact coupling is normally provided with a respective mechanism for automatically opening/closing the flap during coupling/uncoupling.

For example, printed publication EP 0 982 215 B1 discloses an electrical contact coupling for automatic central buffer couplings in which a mechanical central buffer coupling is provided on which the electrical contact coupling is held in longitudinally displaceable fashion. This known prior art electrical contact coupling comprises at least one plug connection connected by means of a connection line arranged at the point of separation of each vehicle to be coupled. In order to avoid having a redundant contact arrangement disposed symmetrically to the vertical central longitudinal plane of the coupling rod and to enable a simpler and lighter design of the electrical contact coupling as a whole, the electrical contact coupling according to this prior art further comprises a longitudinally displaceable adapter box which is disposed between the respective plug connections of the coupled railway vehicles in the coupling state and on only one of the respective plug connections in the uncoupling state. The adapter box contains the necessary electrical connecting lines to connect the connection lines of the vehicles or car bodies to be coupled.

An electrical contact coupling for automatic central or central buffer couplings is furthermore known for example from printed publication DE 199 26 085 A1. This electrical contact has a contact holder with electrical connection contacts which is affixed to the coupler head of the mechanical central coupling or central buffer coupling and guided so as to be longitudinally displaceable. To protect the electrical connection contacts as optimally as possible, this prior art provides for the contact holder to be displaceable from a rearward, uncoupled position into a forward, coupling-ready position, wherein the contact holder is covered by a protective flap in the rearward position and is exposed in the forward position by the pivoting of the protective flap.

The fundamental problem with the electrical contact couplings known from the prior art and described above is particularly the mechanical wear on the current/data-carrying cables to be interconnected by the electrical contact couplings of two adjacent car bodies. Because in the conventional solutions the electrical contact coupling must first be displaced into the coupling-ready state relative the mechanical coupling, mechanical damage is unavoidable, particularly from wear on the external current or data-carrying cables/cable harnesses which realize a relative movement to the coupling during the coupling process. Moreover, the conventional solutions require a relatively complex mechanism for the electrical coupling process which is usually mounted external of the electrical contact coupling housing. There is accordingly the further problem of atmospheric influences such as ice and snow being able to cause malfunction of the external components, particularly a total failure of the external mechanism.

Conventional electrical contact couplings are thus unable to be of just any randomly small design.

Furthermore, conventional systems require regular maintenance and inspections of the cables carrying current/data in order to be able to ensure proper signal or data transmission. Particularly necessary is regularly inspecting and replacing the connections to the parts of the electrical contact coupling which move relative to the mechanical coupler head as these are subject to high mechanical wear.

Starting from the disadvantages and problems related to the conventional electrical contact couplings as addressed above, the task on which the present invention is based is that of optimizing an electrical contact coupling for a track-borne vehicle, particularly a railway vehicle, to the effect of being able to considerably reduce operational maintenance of the electrical contact coupling, which is in particular resistant to malfunction, while simultaneously ensuring reliable signal/data transmission.

A further task of the present invention is to be seen as specifying an electrical contact coupling of overall simpler and lighter design compared to the known prior art solutions, wherein the electrical contact coupling further exhibits smaller structural dimensions.

These tasks are solved by the subject matter of independent claim 1. Advantageous further developments of the electrical contact coupling according to the invention are set forth in the dependent claims.

According thereto, in particular proposed is an electrical contact coupling for a track-borne vehicle, particularly a railway vehicle, wherein the electrical contact coupling comprises a coupling housing having at least one front end housing opening. In contrast to the electrical contact couplings known from the prior art and described at the outset, however, the coupling housing of the present invention is not displaceable relative to the coupler head of a mechanical coupling; instead, it is provided for the coupling housing of the electrical contact coupling to be fixedly connected (i.e. rigidly) to the mechanical coupling, particularly a central coupling or central buffer coupling, and in particular no longer displaceable relative to the mechanical coupling.

This measure enables the coupling housing to have a considerably smaller design compared to the coupling housings of the known prior art electrical contact couplings since the inventive solution no longer requires the mechanism needed to displace the coupling housing to also be integrated into said coupling housing.

Even if the inventive electrical contact coupling is no longer provided with a coupling housing needing to be displaced relative to the mechanical coupling in order to form an electrical coupling, the inventive solution still ensures that the electrical contacts of the electrical contact coupling will not be coupled until the coupler heads of the mechanical couplings of two adjacent car bodies rigidly couple with nearly zero play. The inventive electrical contact coupling hereby specifically provides for arranging a first contact holder having at least one and preferably a plurality of particularly adjacently arranged electrical contacts in the coupling housing. Contacting supports of preferably plate-shaped design are further provided and comprise at least one and preferably a plurality of particularly adjacently formed contact tabs extending in the longitudinal direction of said contacting supports. The invention thereby provides for the contacting support to be displaceable in the longitudinal direction of the coupling housing relative to said coupling housing from a first position, in which the contacting support with the at least one contact tab is completed accommodated within the coupling housing, into a second position and vice versa, wherein at least the front end region of the contacting support protrudes from the housing opening in the second position to form an electrical contact between the at least one contact tab and at least one electrical contact of a mating coupling of preferably structurally identical design to the electrical contact coupling.

The advantages able to be achieved with the inventive electrical contact coupling are obvious: Particularly advantageous is that the inventive electrical contact coupling does not need to make any relative movement to the associated mechanical coupling in order to couple with a mating coupling of an adjacent car body or vehicle respectively. Instead, the inventive solution provides for only the preferably plate-shaped contacting support being displaced relative to the coupling housing of the electrical contact coupling from its first position into its second position in which the respective contact tab or tabs of the contacting support protrude(s) from the front housing opening of the coupling housing and can form an electrical contact with the contacts of a mating coupling. By so doing, it is no longer necessary for the current or data-carrying cables to be moved relative to the coupling when the electrical contact couplings are being coupled, whereby the mechanical wear on these cables is considerably reduced.

Additionally thereto, the entire mechanism for displacing the coupling housing of the electrical contact coupling can be dispensed with, this significantly simplifying the structure of the electrical contact coupling and in particular realizing a considerable reduction in weight. Moreover noted as an additional advantage is the considerable reduction in the dimensions of the coupling housing of the inventive electrical contact couplings compared to the dimensions of the coupling housings of conventional electrical contact couplings.

According to one preferential realization of the electrical contact coupling according to the invention, it is provided for the first contact holder to be configured and designed as a receiving member for receiving at least the front end region of a contacting support of a preferably structural identical mating coupling to the electrical contact coupling when the electrical contact coupling is connected (coupled) to the mating coupling and the contacting support of the mating coupling is in its second position. In conjunction hereto, it is particularly advantageous for the individual electrical contacts provided in the first contact holder to be in the form of contact sleeves or similar sliding or slide contacts, into which a corresponding member of the mating coupling to be received can be received in order to ensure electrical contact. However, other embodiments are of course also conceivable.

It is particularly preferential for the first contact holder to be detachably and replaceably connected to the housing of the electrical contact coupling so that it can be replaced with the lowest possible maintenance effort. As noted above, the electrical contacts of the first contact holder are preferably designed as electrical sliding or slide contacts, whereby the electrical data or signal lines of the electrical contact coupling can be connected to said contacts. Since the first contact holder does not move relative to the housing of the electrical contact coupling, the electrical data or signal lines connected to the contacts of the first contact holder are thus also no longer subject to increased wear.

One preferential realization of the inventive solution provides for the electrical contact coupling to further comprise, additionally to the first contact holder, a second contact holder arranged in the coupling housing, wherein the second contact holder is likewise provided with at least one and preferably a plurality of particularly adjacently arranged electrical contacts. The second contact holder is preferably fixedly connected to the housing of the electrical contact coupling, whereby it is again suitable here as well for the connection between the two contact holders and the housing of the electrical contact coupling to be designed such that the second contact holder can be detached from the housing of the electrical contact coupling with little effort and thus replaced.

Essential, however, is for the second contact holder to be attached to the contacting support and guide it during the movement of the contacting support relative to the housing of the electrical contact coupling. In particular, this can be realized by the contacting support being guided at least in part by the second contact holder during its relative movement to the coupling housing of the electrical contact coupling. The contacting support is hereby accorded the function of electrically interconnecting the at least one electrical contact of the second contact holder and at least one electrical contact of a mating coupling preferably structured identically to the electrical contact coupling.

Alternatively thereto, the second contact holder can however also be designed as the end region of the at least one contact tab. Accordingly, it is particularly provided for the at least one electrical contact of the second contact holder to be mounted on the surface of the contacting support. In other words, the at least one contact tab of the contacting support is hence itself designed as a second contact holder. Thus, the corresponding signal lines of the second contact holder are also fixed directly on the at least one contact tab of the contacting support. As will be described in greater detail below, particularly the front end region of the at least one contact tab can thereby be designed as a second contact holder. In this regard, it is thus no longer necessary to provide for a further wearing part to constitute the second contact holder. Instead, the front end region of the at least one contact tab can be directly connected to the signal lines.

As noted above, the second contact holder configured as a separate component part assumes a dual function to a certain extent: On the one hand, the second contact holder accommodates the at least one and preferably plurality of electrical contacts to be interconnected with the electrical contact coupling. On the other hand, the second contact holder serves as a guide for guiding the contacting support in its movement relative to the electrical contact coupling housing. Additionally, however, providing further guide elements, particularly guide rails, in the housing of the electrical contact coupling is of course also conceivable for the purpose of guiding the relative movement of the contacting support.

Like the first contact holder, the second contact holder is also fixedly connected to the electrical contact coupling housing in preferably detachable and replaceable manner, whereby according to preferential realizations of the inventive solution, the at least one electrical contact of the second contact holder is designed as an electric sliding or slide contact to which an electrical data or signal line of the electrical contact coupling can be connected. Since the second contact holder is fixedly connected to the housing of the electrical contact coupling, no increased mechanical wear thus occurs to the data or signal lines connected to the respective electrical contact of the second contact holder.

So as to prevent moisture, dust or other contaminants from being able to enter into the coupling housing through the front housing opening in the uncoupled state of the electrical contact coupling, it is advantageous to provide an appropriate sealing arrangement designed to seal the at least one front housing opening provided in the coupling housing particularly in the first position of the contacting support. Hereby conceivable is in particular for the sealing arrangement to comprise a leaf seal, brush seal and/or a mechanical flap; it is of course however also possible in this context to realize the sealing arrangement by means of a pressure seal.

With respect to the contacting support, it is in particular provided for same to be formed from an electrically non-conductive insulating material or comprise a base body made of an electrically non-conductive insulating material respectively. According to one aspect of the present invention, the above-cited at least one contact tab extending in the longitudinal direction of the contacting support is accommodated in the insulating material such that preferably only the two end regions of the at least one contact tab are at least partly exposed and form corresponding electrical contact areas. In so doing, the contact tabs, which ultimately serve in interconnecting the contacts to be electrically connected, are optimally protected against wear or environmental influences.

According to a further aspect of the present invention, the rear end region of the contact holder, opposite from the front end region of said contact holder, is designed as a flexible circuit board.

Such a flexible circuit board is elastically deformable within a suitable selectable tolerance range. Moreover, such a circuit board has good electrical conductivity.

Sliding or slide contacts can hereby prevent double contact between the contact tabs in the circuit board area. According to this advantageous aspect of the invention, designing the rear end region of the contact holder as a flexible circuit board namely ensures that the rear end region of the contact holder automatically presses at preferably a certain pretensioning force against electrical contacts of the electrical contact coupling, or a mating coupling of structurally identical design to the electrical contact coupling respectively, when the rear end region of the contact holder is brought into proximity with the electrical contacts.

Doing so can reduce the wear on the rear end region of the contact holder or the contact tabs respectively since no double contact occurs between the contact tabs and instead only one area of the circuit board (e.g. upper or underside) comes into contact with the electrical contacts of the electrical contact coupling or a respective mating coupling.

According to a further aspect of the invention, in the first position of the contacting support, the base body of said contacting support is arranged such that the contact tabs of the contacting support in the front and rear end region of said contacting support are not in electrical contact with the electrical contact coupling or a respective mating coupling. This can in particular prevent the contact tabs in the front end region of the contacting support from contacting the electrical contacts of the electrical contact coupling in the contacting support's retracted state, meaning that the contact tabs would have to cycle through twice as many cycles as the contact tabs in the rear end region of the contacting support during the coupling of the electrical contact coupling to a corresponding mating coupling. The contact tabs in the front end region of the contacting support would thereby be stressed twice as often as the contact tabs in the rear end region of the contacting support. Appropriately selecting the spacing as described above (no contact between the contact tabs and the electrical contacts in the first position) can prevent this stress, which thereby in turn again reduces wear.

According to a further aspect of the invention, the contact tabs, preferably the contact tabs in the front end region or the rear end region of the contacting support, comprise elastic elements to enable establishing an electrical contact between the contact tabs and electrical contacts of the electrical contact coupling or a corresponding mating coupling respectively.

The elastic elements of the contact tabs can thereby ensure that sliding or slide contact is made in a flat plane. The elastic elements being formed on the contact tabs and not on the electrical contacts of the electrical contact coupling ensures reduced wear on the electrical contacts of the electrical contact coupling and that instead of wear on the electrical contacts of the electrical contact coupling, there is wear on the respective contact tabs of the contacting support. The contact tabs of the contacting support and/or the contacting support itself are considerably easier to replace or change than the electrical contacts of the electrical contact coupling.

According to a further aspect, the present invention relates to a coupler head for a track-borne vehicle, particularly a coupler head of an automatic central coupling or central buffer coupling, wherein the coupler head of said central coupling or central buffer coupling (also referred to herein as "mechanical coupling") comprises a coupler head housing as well as a face plate terminating the front end of the coupler head housing. At least one electrical contact coupling in accordance with the present invention is furthermore provided. Unlike in the approaches discussed at the outset and known from the prior art, this aspect of the present invention provides for the coupling housing of the at least one electrical contact coupling preferably being fixedly (i.e. rigidly) connected to the coupler head housing of the mechanical coupling such that the frontal area of the coupling housing of the electrical contact coupling is in or is in direct proximity to the vertical coupling plane of the coupler head. In other words, it is no longer necessary according to this aspect for the electrical contact coupling to be displaced relative to the mechanical coupling in order to couple the electrical contacts.

According to a further development of the latter aspect of the present invention, it is provided for at least part of the face plate of the mechanical coupling's coupler head housing to protrude over the frontal area of the coupler head housing and the at least one electrical contact coupling affixed to the coupler head housing of the mechanical coupling be formed in the face plate's protruding areas. It is hereby particularly provided for at least one slot-like opening to be formed in the protruding area of the coupler head housing's face plate through which at least part of the contacting support can extend when the contacting support is displaced from its first (retracted) position into its second (protruding) position.

According to an alternative further development of the latter aspect of the present invention, it is provided for the electrical contact coupling to be spring-mounted or suspended relative to the coupler head of the automatic central coupling or central buffer coupling.

Doing so can thus achieve not having any vibrational motion of the coupler head of the automatic central coupling or central buffer coupling, due for example to the coupling process, being transmitted to the electrical contact coupling. This type of transmission could exert mechanical stress on the electrical contact coupling, particularly during the coupling of the electrical contact coupling to a respective mating coupling, which could damage the electrical contact coupling and result in a greater degree of wear. A spring-mounted or suspended mounting of the electrical contact coupling prevents such a transmission of (mechanical) vibration and enables the electrical contact coupling to be unerringly coupled to a corresponding mating coupling.

Figure 2A:
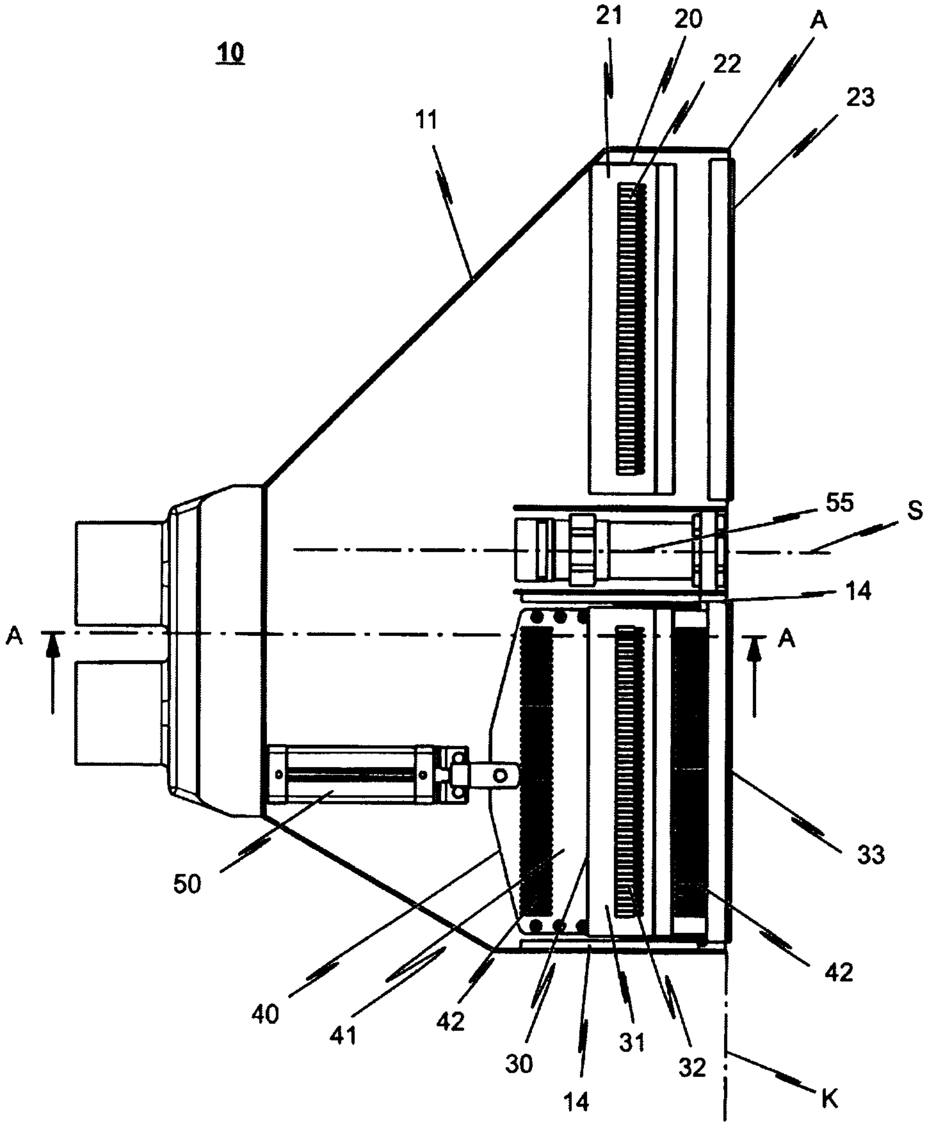
Figure 2B:
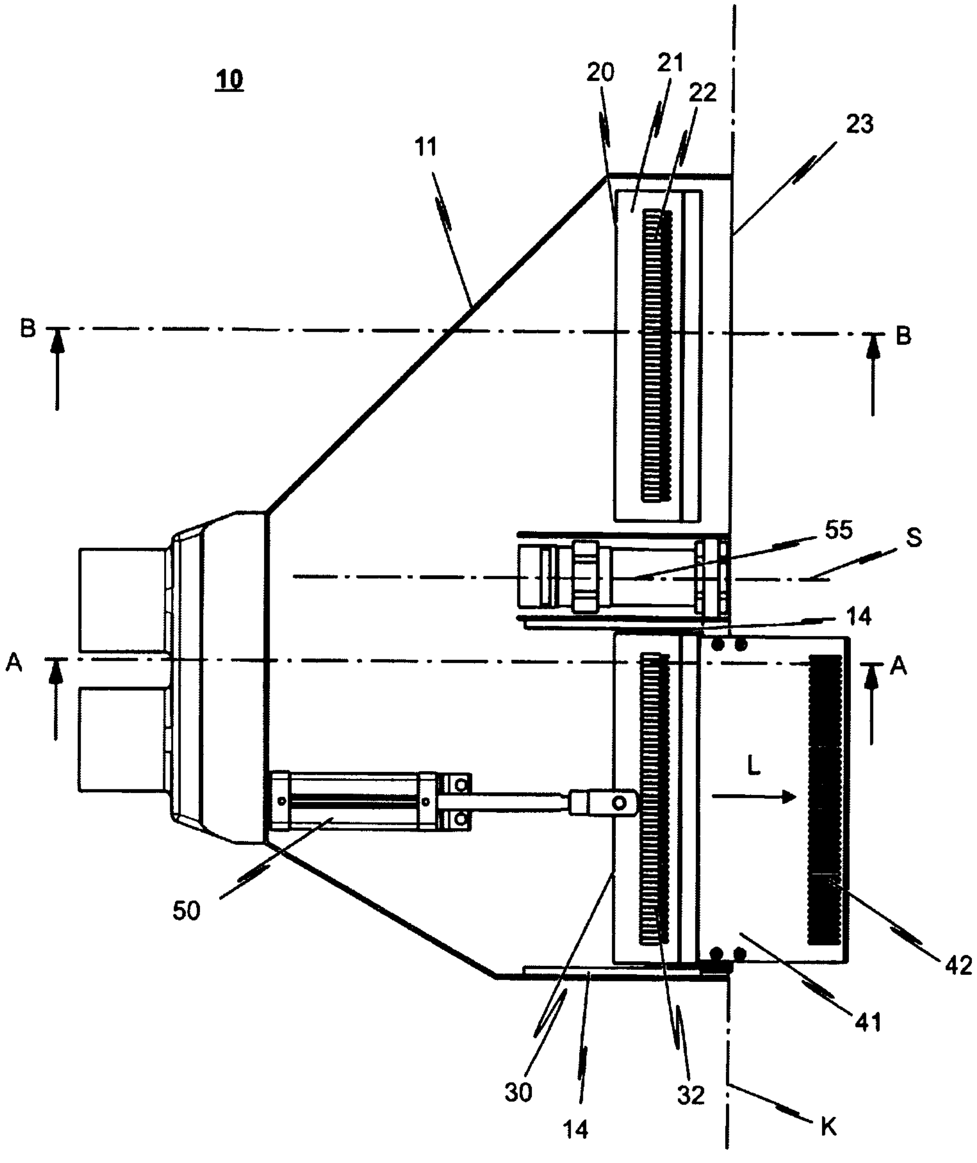
Figure 3A:
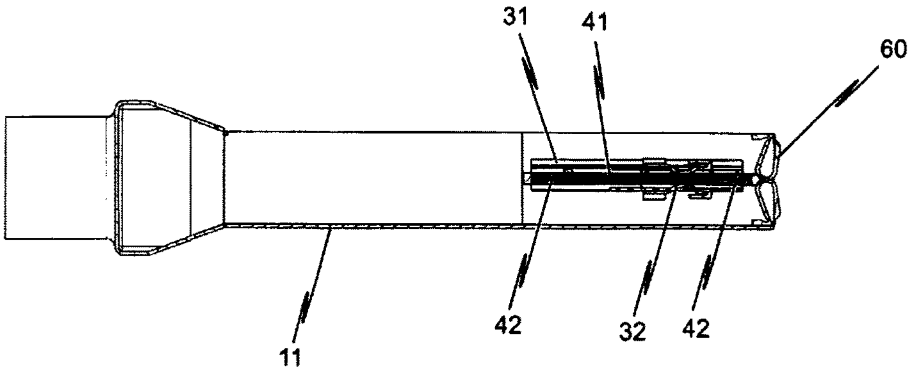
Figure 3B:
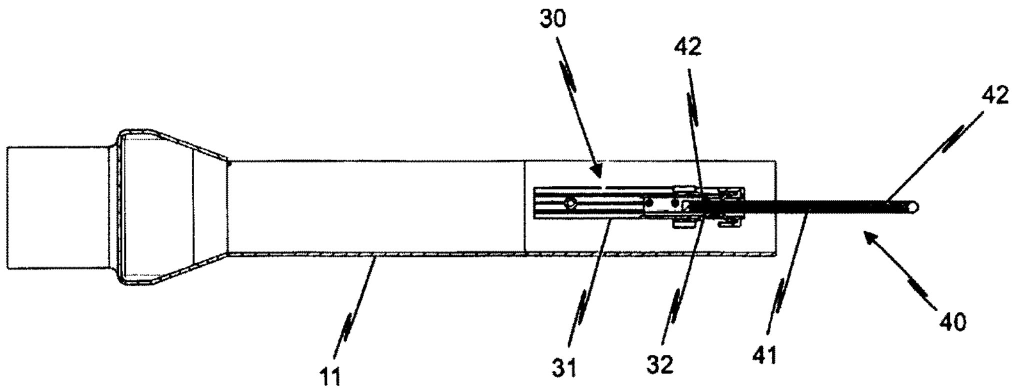

The following will reference the accompanying drawings in describing the inventive solution in greater detail based on example embodiments. Shown are:

FIGS. 1*a* 1*b*, and 1*c*: are perspective views of a conventional electrical contact coupling with an open flap as known from the prior art;

FIG. 2*a*: a plan view of a first example embodiment of the inventive electrical contact coupling with the coupling housing cover removed, wherein the contacting support of the electrical contact coupling is in its first position in which the contacting support is completely accommodated within the coupling housing of the electrical contact coupling;

FIG. 2*b*: a sectional view along the A-A line of the electrical contact coupling according to the FIG. 2*a* depiction;

FIG. 3*a*: a plan view of the electrical contact coupling according to the first example embodiment of the present invention with the coupling housing cover removed, wherein the contacting support of the electrical contact coupling is in its second position in which at least the front end region of the contacting support protrudes from the housing opening of the coupling housing;

FIG. 3*b*: a sectional view along the A-A line from FIG. 3*a;*

Figure 4:
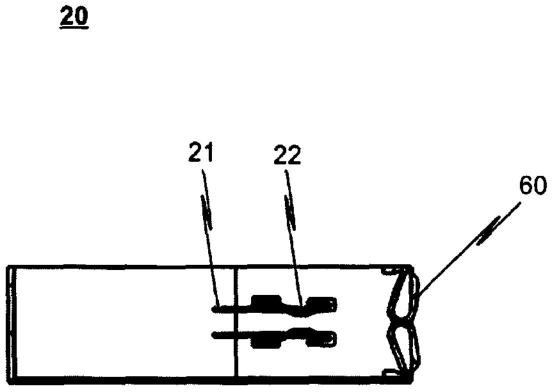

FIG. 4: a sectional view along the B-B line from FIG. 3*a;*

Figure 5A:
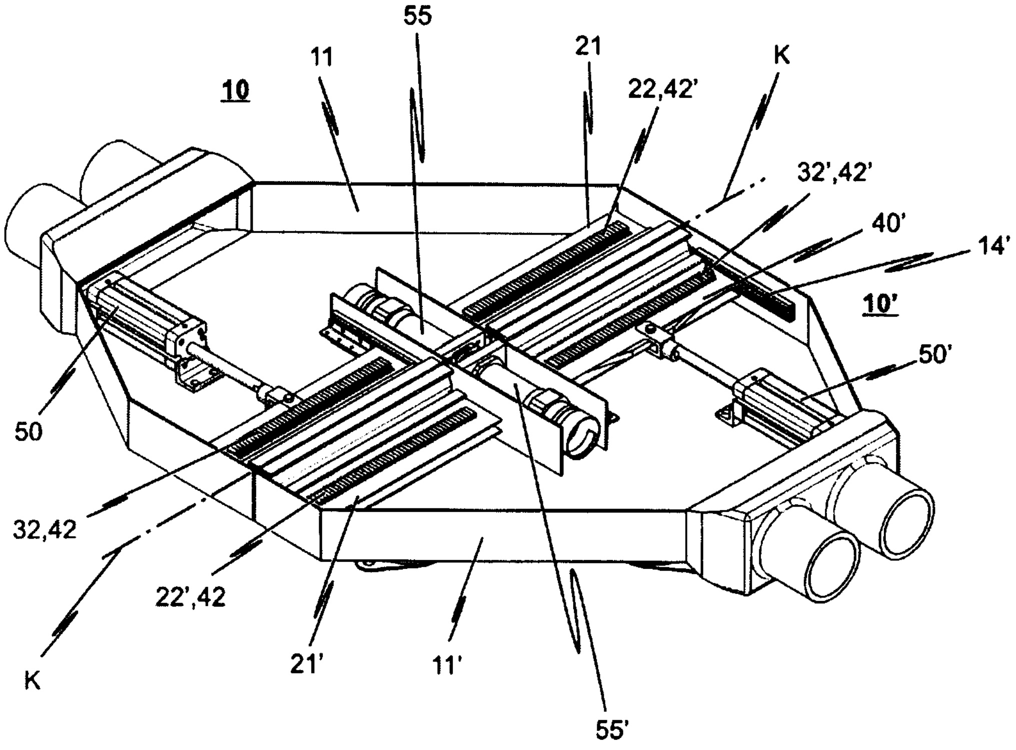
Figure 5B:
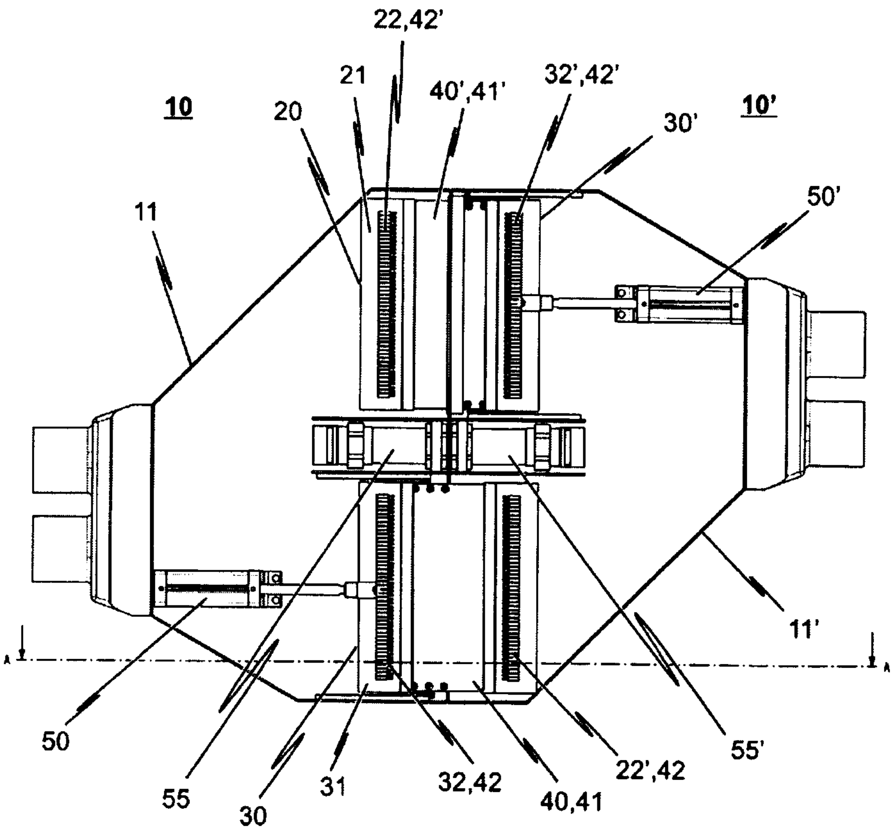

FIG. 5*a*: a perspective view of the first example embodiment of the inventive electrical contact coupling in a state in which the electrical contact coupling is coupled to a mating coupling of structurally identical design to the electrical contact coupling;

FIG. 5*b*: a plan view of the coupled electrical contact couplings of FIG. 5*a;*

Figure 6A:
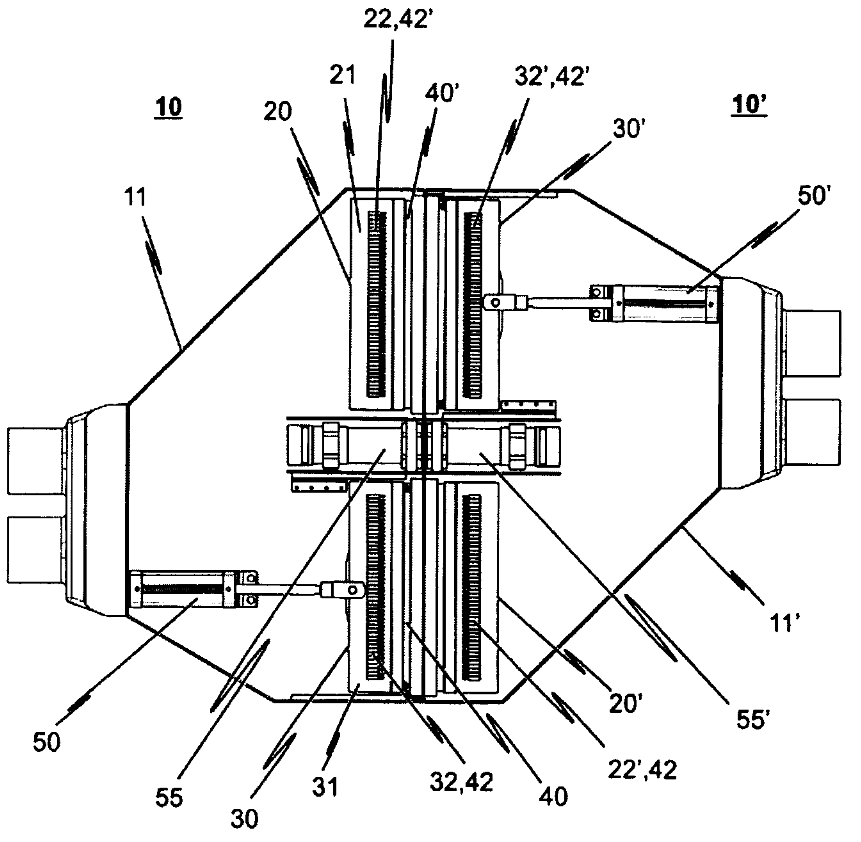
Figure 6B:
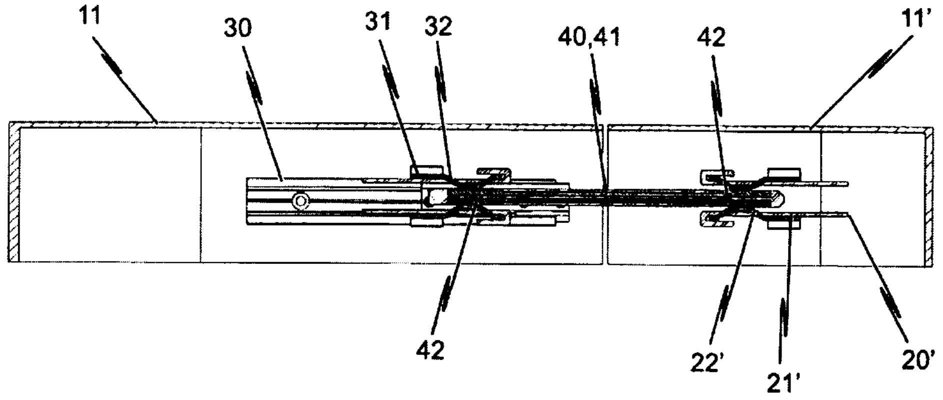

FIG. 6*a*: a plan view of a second example embodiment of the inventive electrical contact coupling with the coupling housing cover removed, wherein the electrical contact coupling is coupled to a mating coupling of structurally identical design;

FIG. 6*b*: a sectional view along the A-A line from FIG. 6*a;*

Figure 7A:
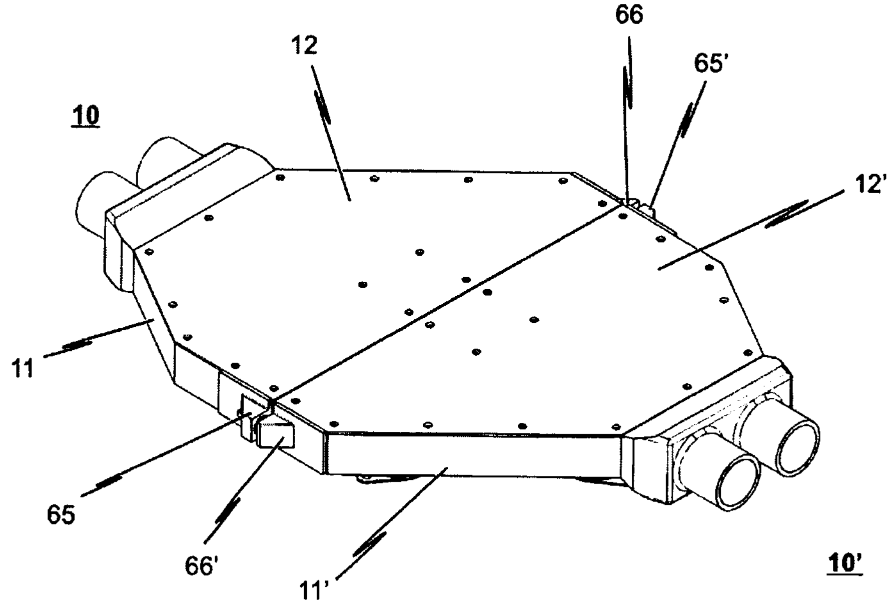
Figure 7B:
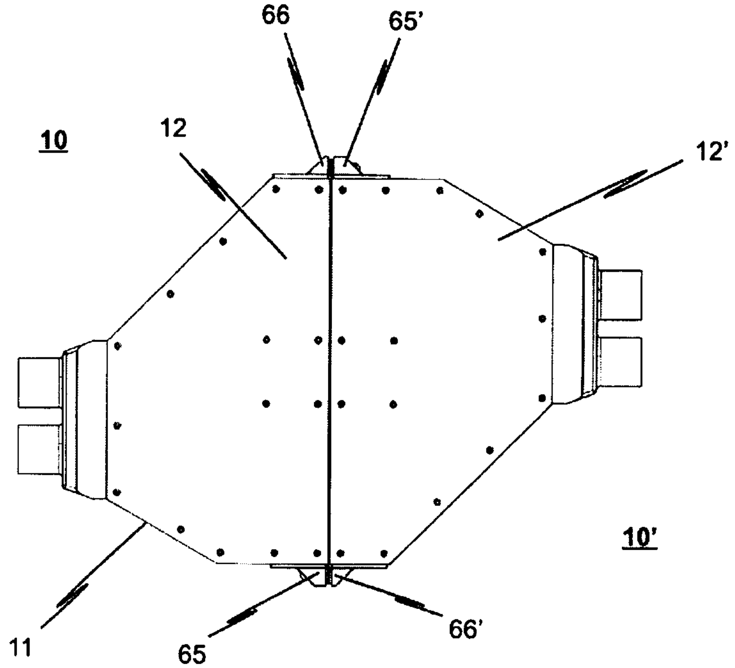
Figure 7C:
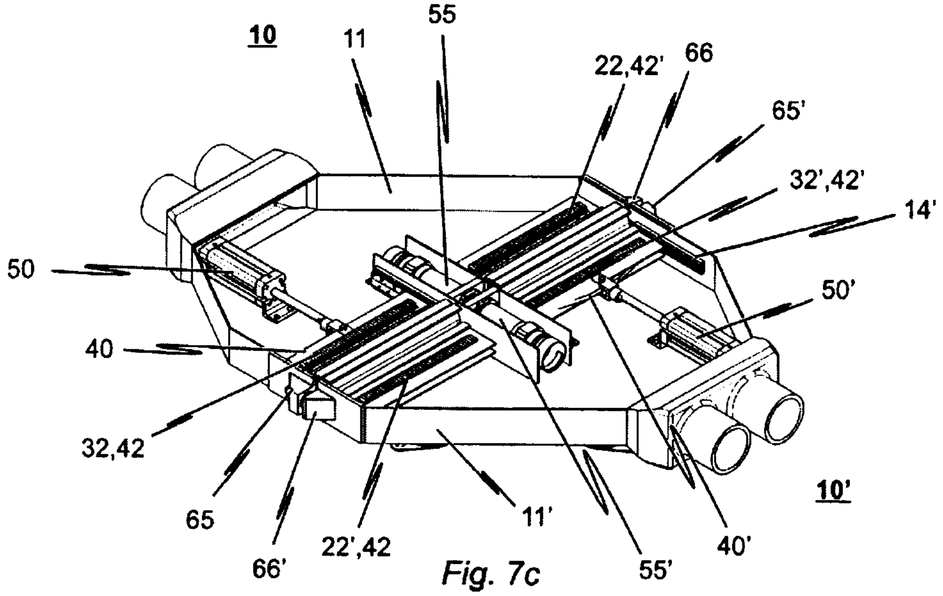
Figure 7D:
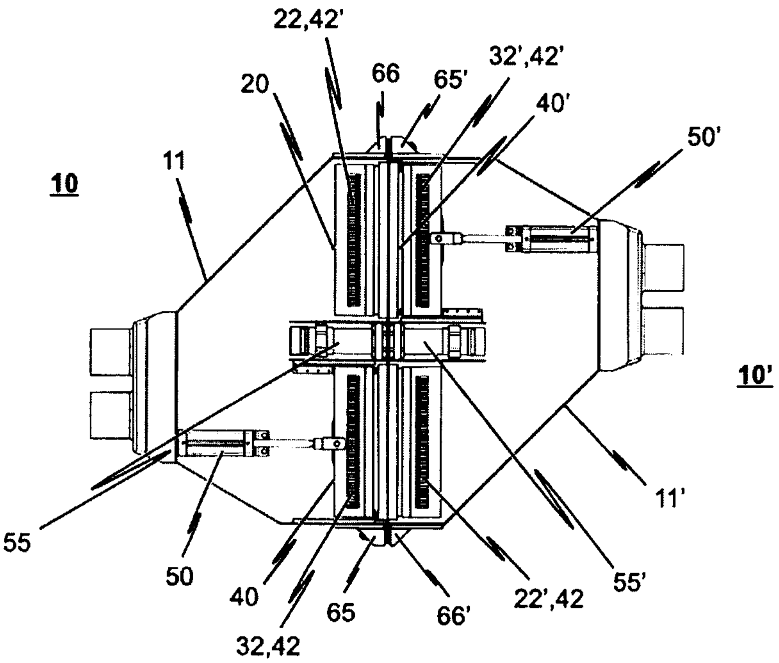
Figure 8:
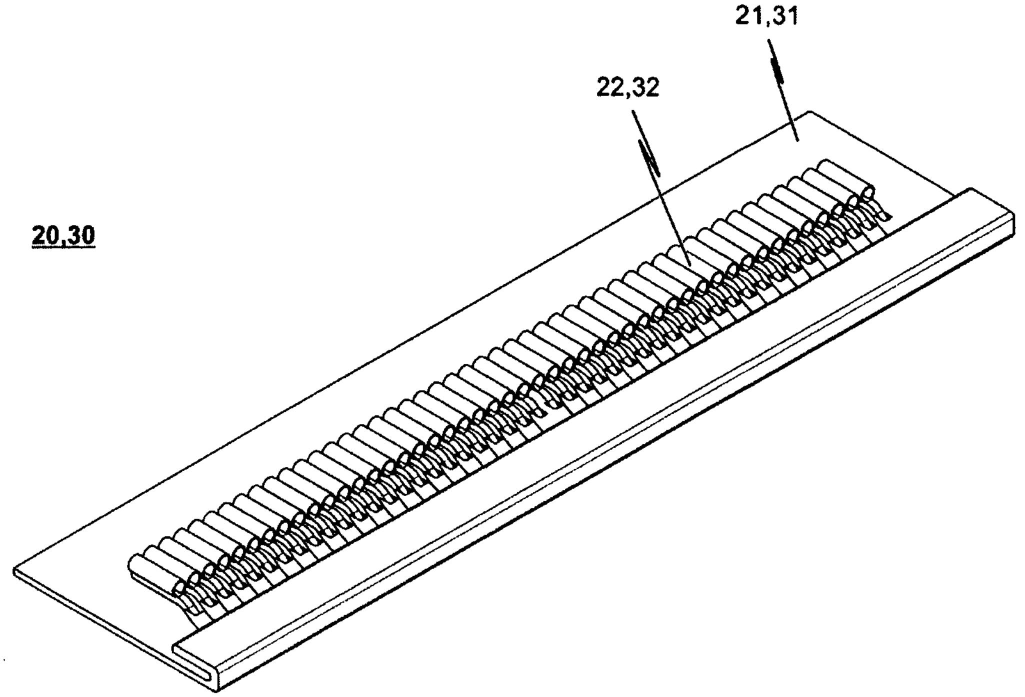
Figure 9A:
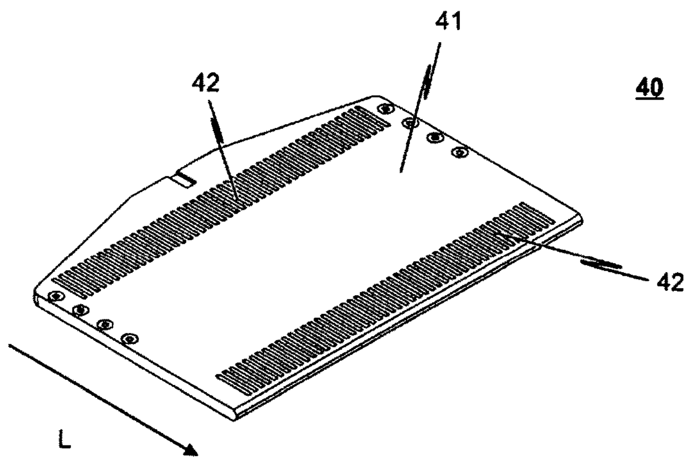
Figure 9B:
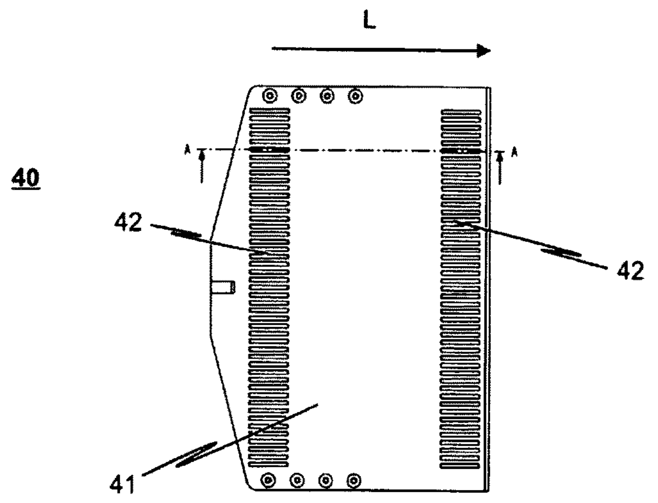

FIG. 7*a*: a perspective view of a third example embodiment of the inventive electrical contact coupling with its coupling housing cover, wherein the electrical contact coupling is coupled to a mating coupling of structurally identical design;

FIG. 7*b*: a plan view of the third example embodiment of the inventive electrical contact coupling in a state in which the electrical contact coupling is coupled to a mating coupling of structurally identical design;

FIG. 7*c*: a perspective view of the third example embodiment of the inventive electrical contact coupling with its coupling housing cover removed, wherein the electrical contact coupling is coupled to a mating coupling of structurally identical design;

FIG. 7*d*: a plan view of the electrical contact coupling according to the third example embodiment of the present invention, wherein the electrical contact coupling is coupled to a mating coupling of structurally identical design;

FIG. 8: a perspective view of an example embodiment of the first or second contact holder of the inventive electrical contact coupling;

FIG. 9*a*: a perspective view of an example embodiment of the plate-shaped contacting support of the inventive electrical contact coupling;

FIG. 9*b*: a plan view of the example embodiment of the plate-shaped contacting support according to FIG. 9*a;*

Figure 9C:
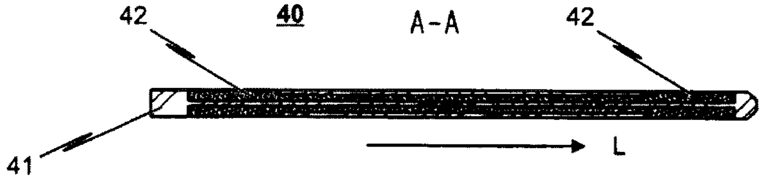

FIG. 9*c*: a sectional view along the A-A line from FIG. 9*a;*

Figure 10A:
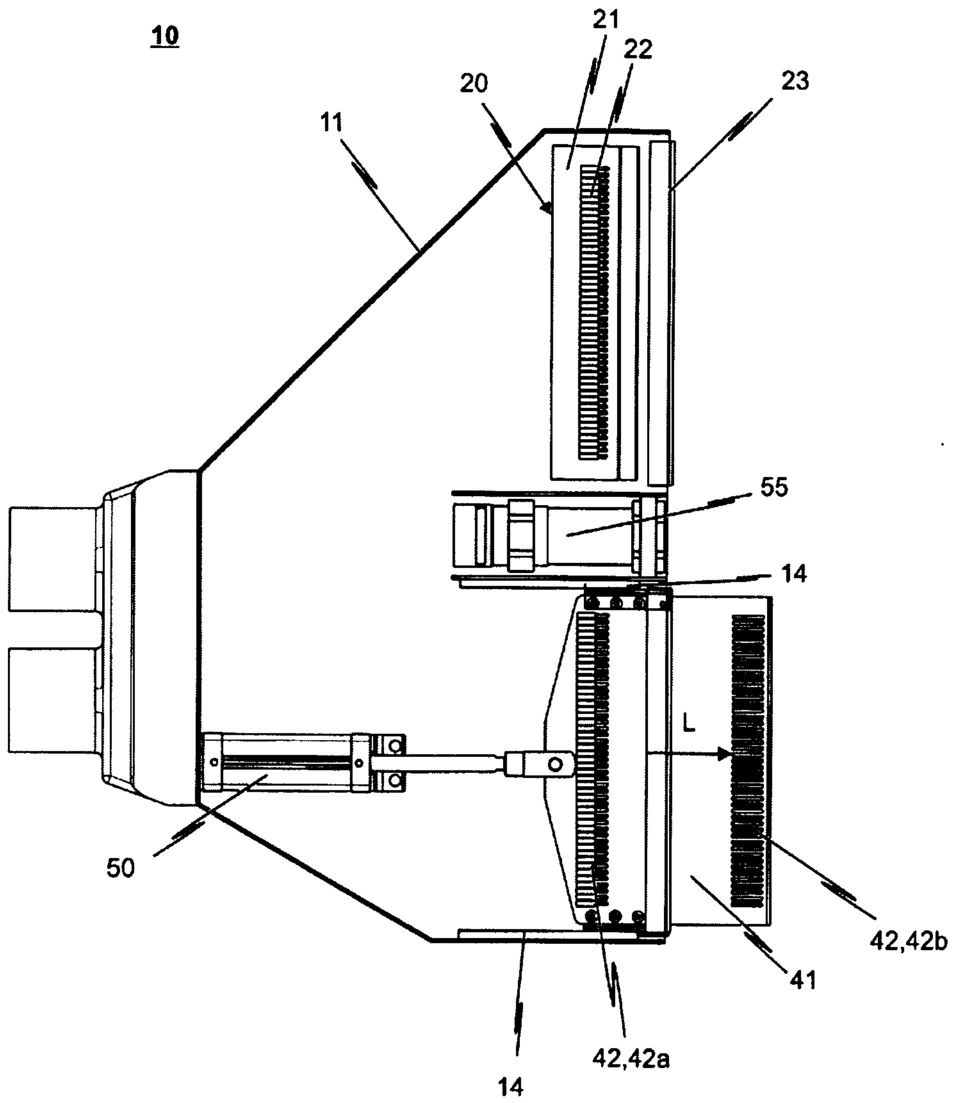
Figure 10B:
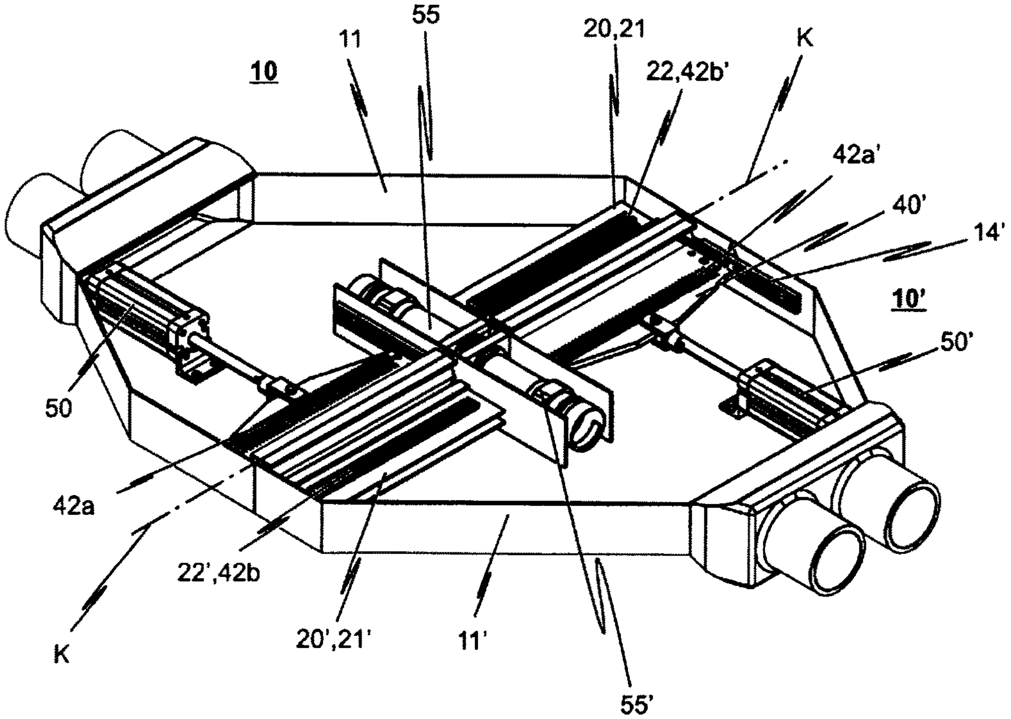
Figure 10C:
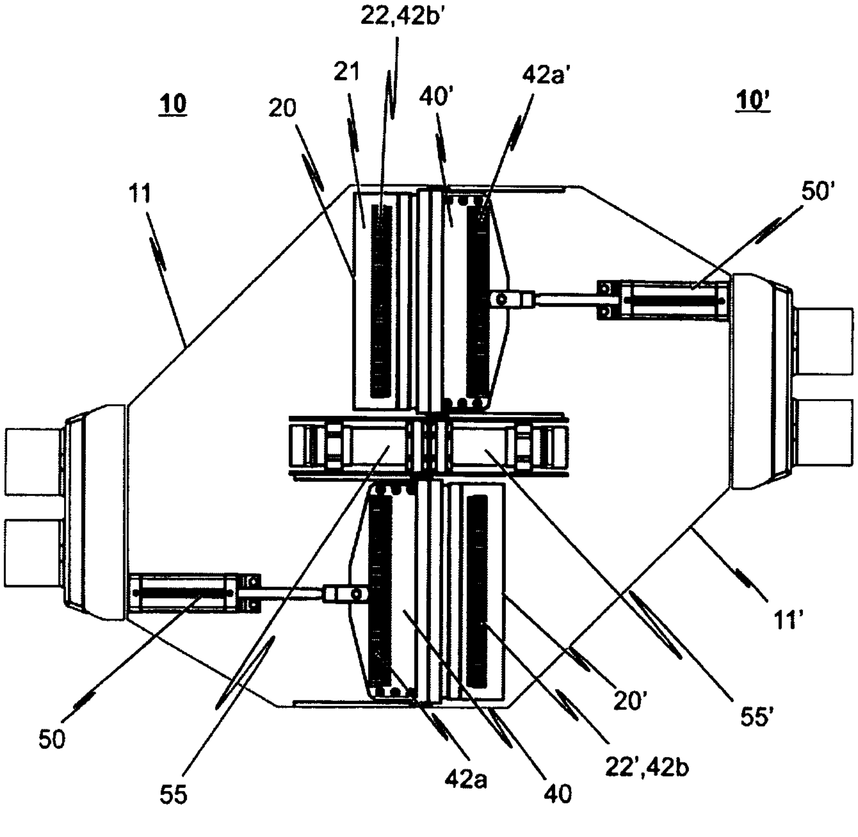
Figure 11A:
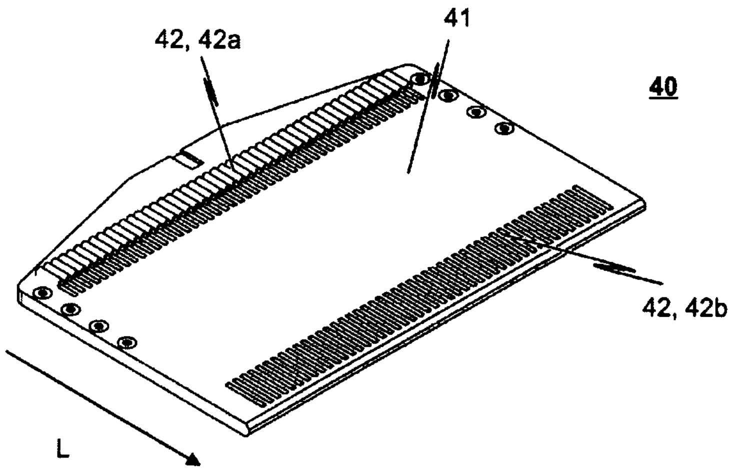
Figure 11B:
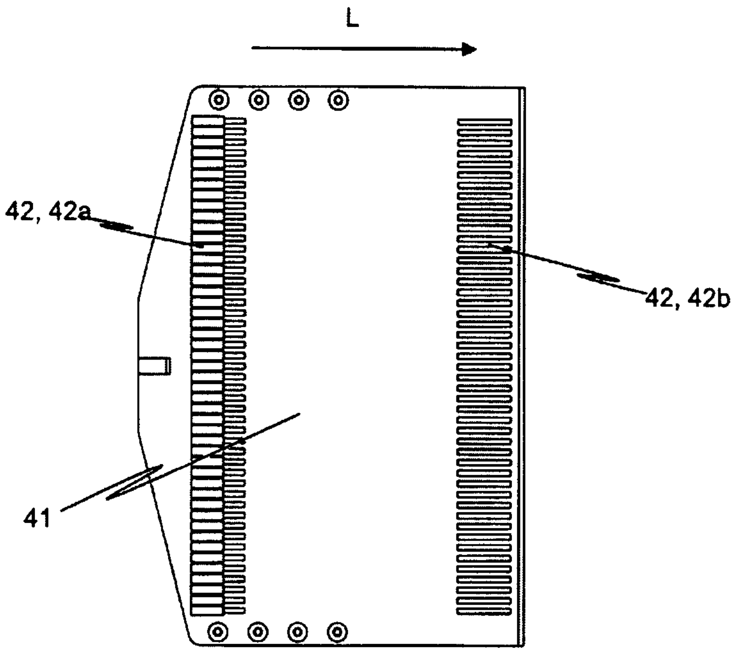

FIG. 10*a*: a plan view of a fourth example embodiment of the inventive electrical contact coupling without coupling housing cover;

FIG. 10*b*: a perspective view of the fourth example embodiment of the inventive electrical contact coupling according to FIG. 10*a* in a state in which the electrical contact coupling is coupled to a mating coupling of structurally identical design;

FIG. 10*c*: a plan view of the fourth example embodiment of the inventive electrical contact coupling according to FIG. 10*a* with the coupling housing cover removed, wherein the electrical contact coupling is coupled to a mating coupling of structurally identical design;

FIG. 11*a*: a perspective view of a second example embodiment of the plate-shaped contacting support of the inventive electrical contact coupling;

FIG. 11*b*: a plan view of the example embodiment of the plate-shaped contacting support according to FIG. 11*a;*

Figure 12A:
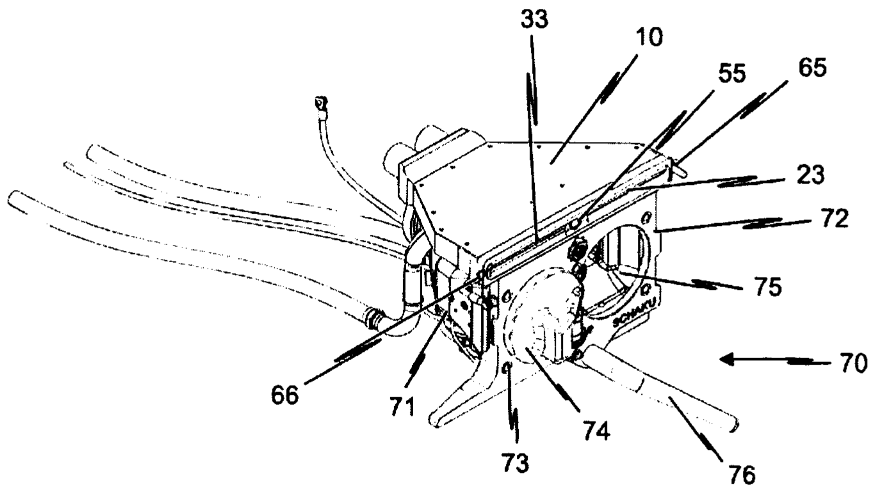
Figure 12B:
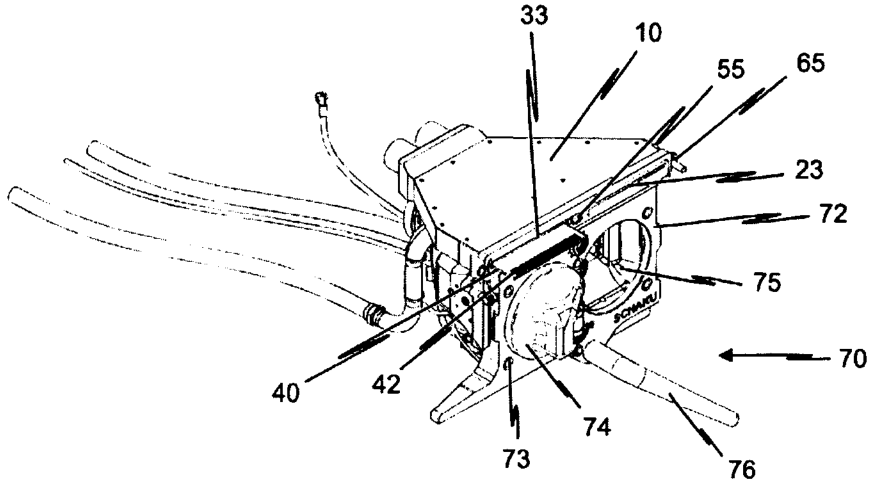
Figure 13:
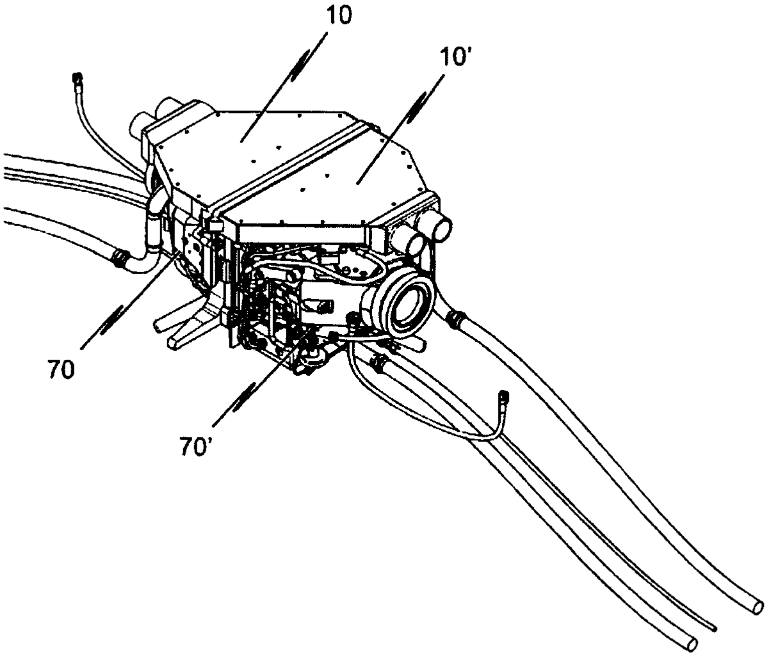
Figure 14:
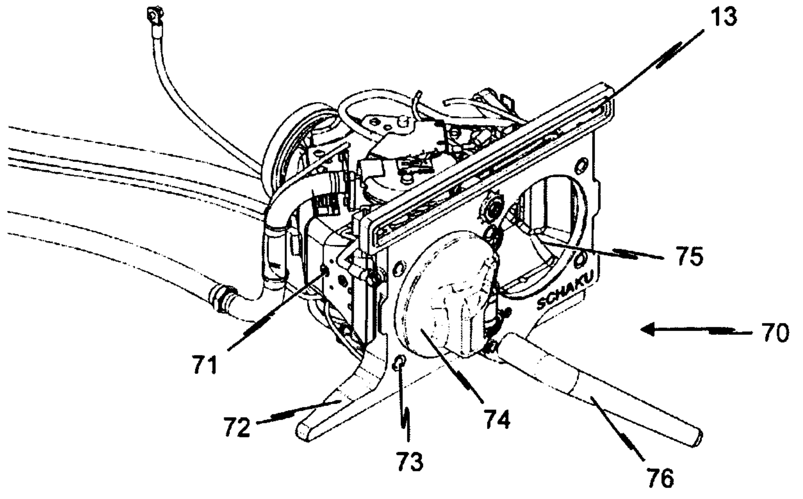
Figure 15:
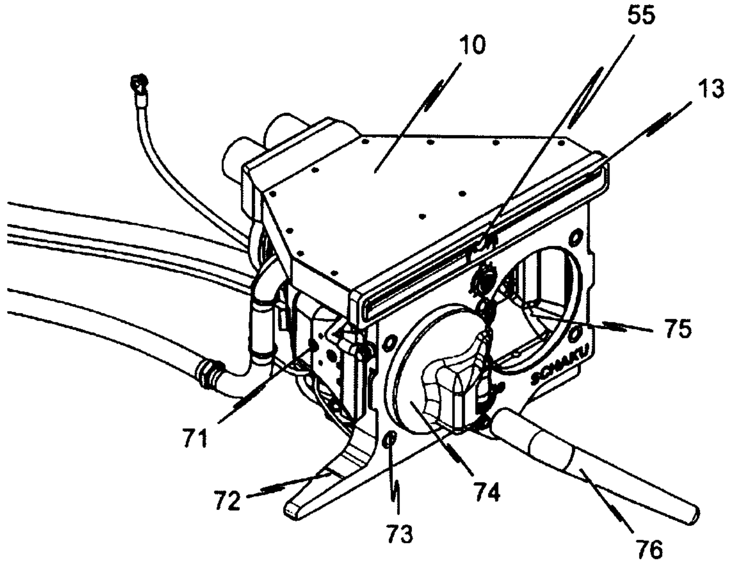
Figure 16:
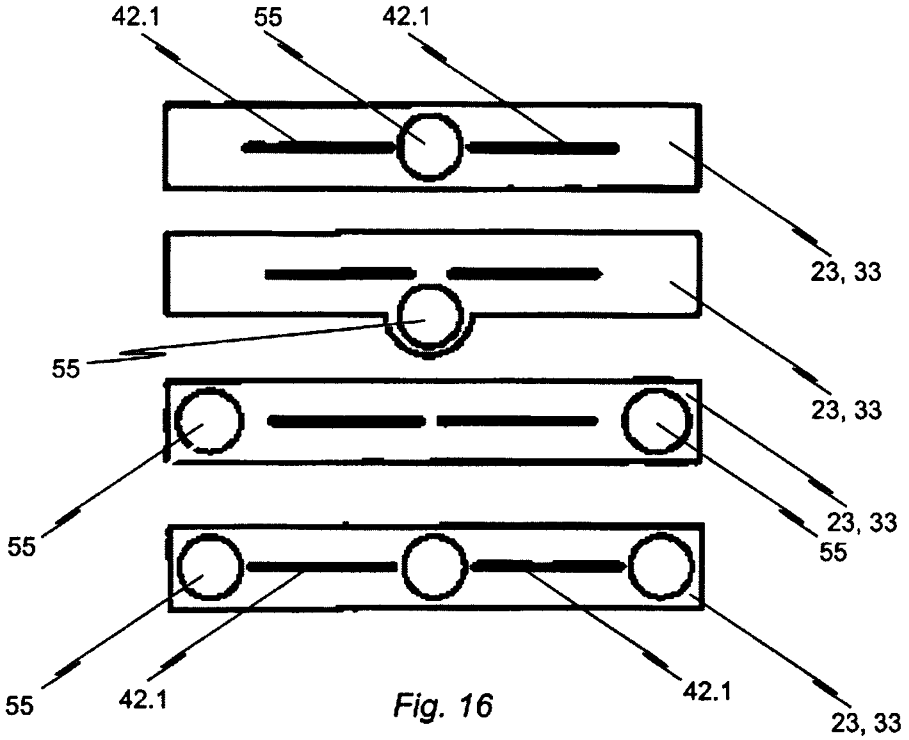
Figure 17:
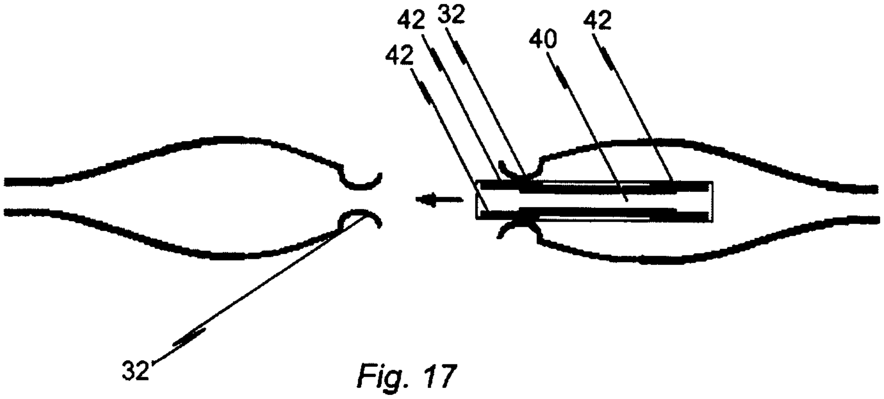
Figure 18:
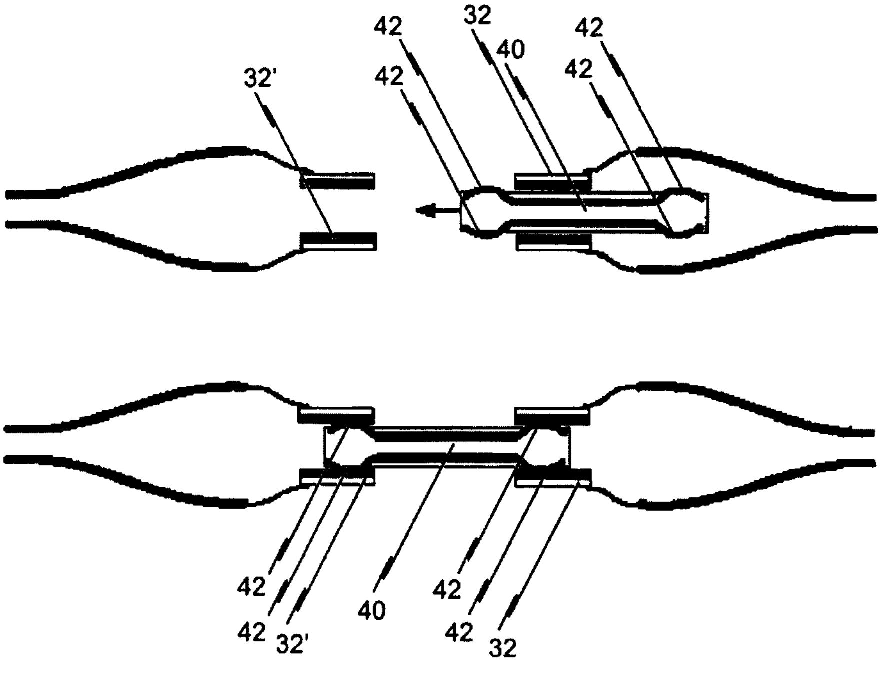

FIG. 12*a*: a perspective view of a coupler head of a (mechanical) central coupling or central buffer coupling of a track-borne vehicle having an electrical contact coupling in accordance with an exemplary embodiment of the present invention, wherein the contacting support of the electrical contact coupling is in its first position in which the contacting support is completely accommodated within the coupling housing of the electrical contact coupling;

FIG. 12*b*: a perspective view of the coupler head according to FIG. 12*a*, albeit wherein the contacting support of the exemplary embodiment of the electrical contact coupling is in its second position here in which at least the front end region of the contacting support protrudes from the housing opening of the coupling housing of the electrical contact coupling;

FIG. 13: a perspective view of the coupler head according to FIG. 12*b* in a state in which the coupler head is mechanically connected to a mating coupler head of structurally identical design and the electrical contact coupling to a structurally identical mating coupling;

FIG. 14: a perspective view of a (mechanical) coupler head of a central coupling or central buffer coupling having a face plate designed for attaching of an example embodiment of the inventive electrical contact coupling;

FIG. 15: a perspective view of the (mechanical) coupler head according to FIG. 14 having an electrical contact coupling according to an example embodiment of the present invention connected to the (mechanical) coupler head;

FIG. 16: a side view of a housing frontal area of an electrical contact coupling according to an example embodiment of the present invention;

FIG. 17: a sectional view of an electrical contact coupling according to an example embodiment of the present invention; and FIG. 18: a sectional view of an electrical contact coupling according to an example embodiment of the present invention.

FIG. 1 depicts a conventional electrical contact coupling 100 commonly known from railway vehicle technology in a perspective view. The electrical contact coupling 100 is designed to be arranged at the upper side or on the side of a mechanical coupler head of a central coupling or central buffer coupling and consists substantially of a coupling housing 101 having a flap 104 which is pivotable relative thereto. A contact holder 102 arranged parallel to the coupling plane is further provided which closes the coupling housing 101 to the front and in which pin contacts 103 are inserted via which electrical signals or energy can be transmitted from the electrical contact coupling 100 to corresponding complementary configured contact holders of a mating coupling (not shown in FIG. 1).

The coupling housing 101 is rectangular in cross section, whereby guides 105 as well as frontal centering elements 106 are provided on the exterior side facing the coupling housing 101. The guides 105 serve to direct a displacement of the coupling housing 101 relative to the coupling housing of a mechanical coupling, particularly a central coupling or central buffer coupling (not shown). This is inasmuch necessary with the conventional electrical contact coupling 100 known from the prior art in that same cannot be coupled to a corresponding mating coupling until the electrical contact coupling 100 has first been displaced into the common (vertical) coupling plane. In this respect, the conventional electrical contact coupling 100 must be provided with a corresponding shifting mechanism 107 which complicates the structure of the electrical contact coupling 100 as a whole and in particular results in relatively large dimensions for the electrical contact coupling 100. An example of such a shifting mechanism 107, which is particularly found on the outer side of the known coupling housing 101, is depicted in FIGS. 1*a* to 1*c*.

Furthermore considered disadvantageous with the conventional electrical contact coupling 100 depicted as an example in FIG. 1 is that the imperative relative motion of the coupling housing 101 relative to the mechanical coupling brought about in the coupling process is basically associated with a stressing of the signal or data lines 108 connected to the electrical contact coupling 100, which inevitably leads to mechanical wear on said signal/data lines 108.

As will be described in greater detail below using the example embodiments of the inventive electrical contact coupling, these disadvantages do not occur with the solution according to the invention.

Specifically, the inventive electrical contact coupling is characterized by the electrical contact coupling or at least the coupling housing of the electrical contact coupling not moving relative to a mechanical coupling connected to the electrical contact coupling when the electrical contact coupling is conveyed into its coupling-ready state. Instead, the invention provides for the coupling housing of the electrical contact coupling to be rigidly connected or connectable to the corresponding mechanical coupling, whereby only a preferably plate-shaped contacting support can move relative to the mechanical coupling and the coupling housing of the electrical contact coupling in order to transition from an uncoupled state (first position) into a coupled or coupling-ready state (second position). In the uncoupled state, the contacting support is in its first position in which the contacting support is completely accommodated within the coupling housing of the electrical contact coupling. In the coupled or coupling-ready state, the contacting support is in its second position in which at least a front end region of the contacting support protrudes from the coupling housing of the electrical contact coupling and is thus suited to forming an electrical contact with a corresponding mating coupling.

FIG. 2*a* depicts a first example embodiment of the inventive electrical contact coupling 10 in a plan view, whereby the coupling housing cover 12 (cf. FIG. 7*a*) of the electrical contact coupling 10 has been removed in this representation in order to allow a view of the internal structure of the electrical contact coupling 10.

The depiction provided in FIG. 2*b*, showing a sectional view along the A-A line from FIG. 2*a*, is to be considered as supplementary to the FIG. 2*a* depiction.

FIG. 3*a* is a plan view of the electrical contact coupling 10 according to the first example embodiment of the present invention with its coupling housing cover 12 removed, wherein the electrical contact coupling 10 is in a coupling-ready state in which the contacting support 40 of the electrical contact coupling 10 is in its second position in which at least the front end region of the contacting support 40 protrudes from the housing opening 33 of the coupling housing 11. FIG. 3*b* is a sectional view along the A-A line in FIG. 3*a* and FIG. 4 is a sectional view along the B-B line in FIG. 3*a*.

The electrical contact coupling 10 of the first example embodiment of the present invention comprises a coupling housing 11 in which all the components of the electrical contact coupling 10 are accommodated. In detail, FIGS. 2*a* and 3*a* depict the coupling housing 11 of the first example embodiment of the inventive electrical contact coupling 10 without coupling housing cover 12.

Although the coupling housing 11 does not have a symmetrical design in plan view, the electrical contact coupling 10 has a symmetrical structure in terms of a vertical axis of reflection S of housing frontal area A.

Inside the coupling housing 11 of the electrical contact coupling 10, a first contact holder 20 is arranged in a first half of said coupling housing 11. A second contact holder 30, which is preferably of structurally identical design to contact holder 20, is arranged in the opposite second coupling housing half, and in such a manner that both contact holders 20, 30 are symmetrical with respect to the vertical axis of reflection S of housing frontal area A.

To be generally understood by the term "contact holder" as used herein is a component which bears at least one and preferably a plurality of electrical contacts. The exact structure of the contact holders 20, 30 used in the example embodiments as disclosed herein will be described in greater detail below with reference to the depiction provided in FIG. 8.

In detail, FIG. 8 is a perspective view of an example embodiment of a contact holder 20, 30 applicable to the example embodiments of the inventive electrical contact coupling 10 disclosed herein. In accordance with the representation provided in FIG. 8, the example embodiment of the contact holder 20, 30 comprises a supporting substrate 21, 31, which is preferably formed from an electrically non-conductive insulating material. At least one and preferably a plurality of adjacently arranged electrical contacts 22, 32 are provided on the supporting substrate 21, 31. The individual adjacently arranged electrical contacts 22, 32 are electrically insulated from one another and designed to each be electrically connected to a respective data or signal line. The data/signal lines are not shown in the accompanying figures in the interest of clarity. It is however self-explanatory that the individual data/signal lines can be connected normally, particularly by soldering, to e.g. the respective end regions of the electrical contacts 22, 32.

The individual electrical contacts 22, 32 arranged in the first and/or second contact holder 20, 30 serve to establish an electrical connection to corresponding electrical contacts of a mating coupling of preferably structural identical design to electrical contact coupling 10, whereby use is made to this end of particularly the contacting support 40 comprising contact tabs 42 as has already been discussed above and will also be discussed in greater detail below.

Further apparent from the FIG. 8 depiction is that the individual electrical contacts 22, 32 of the first or respectively the second contact holder 20, 30 are in each case preferably designed as receiving contacts, thus are designed to receive a (to be received) electrical contact designed correspondingly complementary thereto and thereby establish an electrical connection between an electrical contact 22, 32 and its complementary counterpart. Specifically, the individual electrical contacts 22, 32 of the first/second contact holder 20, 30 are realized as received (or male) contacts, particularly sliding or slide contacts.

Returning to the depictions of FIGS. 2*a* and 3*a*, it should be noted that the first contact holder 20 as well as the second contact holder 30 are arranged symmetrically to the vertical axis of reflection S of housing frontal area A, whereby the two contact holders 20, 30 are fixedly connected to the coupling housing 11 of the electrical contact coupling 10 in preferably detachable and thus replaceable manner. This is advantageous to the extent of the individual data and/or signal lines (not shown in the figures) electrically connected to the corresponding contacts 22, 32 being connected to a rigid or rigidized element, in consequence of which there is no mechanical wear on said data/signal lines as a result of relative motion.

The following will describe the structure and operation of the first example embodiment of the electrical contact coupling 10 in greater detail with particular reference to the depictions provided in FIGS. 2*a* and 3*a*.

In detail, the electrical contact coupling 10 is shown in FIG. 2*a* in a state in which all the components of the electrical contact coupling 10 are accommodated within the coupling housing 11. In other words, in the state shown in FIG. 2*a*, none of the components of the electrical contact coupling 10 extend out of either housing opening 23, 33 provided in housing frontal area A of the coupling housing 11. The housing frontal area A of the coupling housing 11 is thereby positioned in common coupling plane K; i.e. the vertical plane in which a (not shown) mechanical central coupling or central buffer coupling, to which the electrical contact coupling 10 is fixedly connected or connectable, is coupled to a mechanical mating coupling.

In FIG. 3*a*, however, the electrical contact coupling 10 according to the first example embodiment is shown in a coupling-ready state. In this coupling-ready state, a plate-shaped contacting support 40 is displaced forward toward coupling plane K relative to the coupling housing 11 so that the plate-shaped contacting support 40 extends at least partly out of the housing opening 33 of the coupling housing 11 and traverses the vertical coupling plane K. A comparison of the FIGS. 2*a* and 3*a* representations shows that the two contact holders 20, 30 are not displaced relative to the coupling housing 11 when the electrical contact coupling is being conveyed from its initial state (see FIG. 2*a*) into its coupling-ready state (see FIG. 3*a*). Instead, only the above-cited plate-shaped contacting support 40 is displaced toward coupling plane K relative to the coupling housing 11 to convey the electrical contact coupling 10 into its coupling-ready state (see FIG. 3*a*).

A drive 50, particularly a linear drive, which is preferably accommodated in coupling housing 11, is in particular used to the above end. The drive 50, linear drive in particular, is preferably a pneumatic, hydraulic or electrically powered drive. It is however of course also conceivable for a mechanical structure to be provided by means of which the plate-shaped contacting support 40 self-displaces in the direction of coupling plane K relative to the coupling housing 11 when the electrical contact coupling 10 nears a mating coupling of preferably structurally identical design.

The following will reference the depictions provided in FIGS. 9*a* to 9*c* in describing in greater detail the structure and operation of an example embodiment of the plate-shaped contacting support 40 which is in principle suitable for use in the example embodiments of the inventive electrical contact coupling 10 disclosed herein. Specifically, FIG. 9*a* is a perspective view of the example embodiment of the plate-shaped contacting support 40 while FIG. 9*b* is a plan view of the contacting support 40. FIG. 9*c* is a sectional view along the A-A line in FIG. 9*b*.

The plate-shaped contacting support 40 has a (plate-shaped) base body 41 made of an electrically non-conductive insulating material, wherein at least one and preferably a plurality of adjacently configured contact tabs 42 extending in the longitudinal direction L of contacting support 40 are additionally provided. The contact tabs 42 are formed from an electrically conductive material and serve to interconnect the electrical contacts 32 of the second contact holder and corresponding electrical contacts of a mating coupling of preferably structural identical design to electrical contact coupling 10 when electrical contact coupling 10 is coupled to the mating coupling. As can be recognized particularly from the FIG. 9*b* representation, as well as from the sectional view of FIG. 9*c*, the contact tabs 42 are preferably at least partially embedded (integrated) into the insulating material of the base body 41 in order to prevent the contact tabs 42 from being damaged when the plate-shaped contacting support 40 is displaced relative to the coupling housing 11 from its first position, in which the contacting support 40 is wholly accommodated in the coupling housing 11 (see FIG. 2*a*), into its second position, in which at least the frontal end region of the contacting support 40 protrudes out of the corresponding housing opening 33 of coupling housing 11 (see FIG. 3*a*).

What is significant is that the contact tabs 42 are exposed preferably at the front as well as at the rear end region of the contacting support 40 and can at that point enter into sliding or slide contact with corresponding electrical contacts.

In the example embodiments of the inventive electrical contact coupling 10, the plate-shaped contacting support 40 with its contact tabs 42 arranged in its longitudinal direction L serves to electrically interconnect the respective electrical contacts 32 of the second contact holder 30 and the electrical contacts of a mating coupling preferably of structurally identical design to the inventive electrical contact coupling 10.

When the contacting support 40 is in its first position in which it is completely accommodated within the coupling housing 11 of the electrical contact coupling 10 (see FIG. 2*a*), the electrical contacts 32 of the second contact holder 30 respectively configured as sliding or slide contacts are insulated from the corresponding contact tabs 42 of contacting support 40 since the electrical contacts 32 are in contact with the area of the base body 41 of the contacting support 40 in which the contact tabs 42 are not exposed. This can particularly be seen from the sectional depiction provided in FIG. 2*b*.

When, however, the contacting support 40 is in its second position and a part thereof extends out of housing opening 33 of coupling housing 11 (see FIG. 3*a*), the electrical contacts 32 of the second contact holder 30 configured as sliding/slide contacts then contact the exposed regions of the contact tabs 42. This can particularly be seen in the FIG. 3*b* depiction. In this state, there is thus an electrical connection between the respective electrical contacts 32 of the second contact holder 30 and the correspondingly arranged contact tabs 42. In this state, the contact holder 40 with its contact tabs 42 thus lends itself to electrically interconnecting the electrical contacts 32.

In the example embodiment of the inventive electrical contact coupling 10 depicted in FIG. 2*a*/3*a*, an optical and/or electromagnetic signal transmission terminal 55 is employed additionally to the contact holders 20, 30, said terminal being centrically arranged in housing frontal area A in the example embodiments of the inventive electrical contact coupling 10 disclosed herein, namely on the vertical axis of reflection S of housing frontal area A. The frontal housing opening provided in housing frontal area A is insofar divided into two housing openings 23, 33 separated from each other by the signal transmission terminal 55. On the other hand, not arranging the optical and/or electromagnetic signal transmission terminal 55 centrically in the housing frontal area A but rather in housing frontal area A as shown as an example in FIG. 16 is also conceivable. In FIG. 16, diagram i) substantially corresponds to the arrangement of the signal transmission terminal 55 in the center of slots 42.1 for the contact tabs 42 as described above.

Then again, it can be recognized in diagram ii) of FIG. 16 that the signal transmission terminal 55 can also be arranged at an offset from the vertical axis of reflection S of housing frontal area A. As shown in diagram iii) of FIG. 16, arranging a plurality of signal transmission terminals 55 in housing frontal area A is likewise conceivable.

Lastly, the signal transmission terminals 55 can be arranged in a combination of the i), ii), iii) and/or iv) depictions of FIG. 16. Particularly conceivable is applicably selecting the same type of arrangements (e.g. i), i), i)), mixtures/combinations (e.g. i), ii), iv), iii)) or even e.g. vertical arrangements.

The arrangement of the signal transmission terminals 55 or just one signal transmission terminal 55 as well as the number of signal transmission terminals 55 can be selected so as to enable high data transmission rates and/or ensure integrity during data transmission, for example by way of a redundant system.

In order to prevent moisture or dirt from being able to infiltrate into the coupling housing 11 through the frontal housing openings 23, 33 in the uncoupled state of the electrical contact coupling 10, the frontal housing openings 23, 33 are preferably sealed appropriately. The sealing arrangement 60 employed for this purpose can comprise for example a corresponding leaf seal, brush seal or even a mechanical flap. As can be noted from the sectional view of FIG. 2*b*, the first example embodiment makes use of a leaf seal in particular for sealing arrangement 60.

FIG. 4 shows the structure of the first and second contact holder 20, 30 used in the first example embodiment of the inventive electrical contact coupling 10 in a sectional view. In brief, this example embodiment provides for the first and second contact holder 20, 30 to be of overall structurally identical design. The electrical contacts 22, 32 of the contact holder 20, 30 are designed as received (or male) parts, whereby an electrical connection to a correspondingly configured contact element (receiving or female contact element) is made by sliding or frictional contact.

The following will reference the depictions provided in FIGS. 5*a* and 5*b* in describing the operation of the electrical contact coupling 10 according to the first example embodiment in greater detail. Specifically, FIG. 5*a* is a perspective view of the first example embodiment of the inventive electrical contact coupling 10 with its coupling housing cover 12 removed, whereby the electrical contact coupling 10 is shown in a state in which it is coupled to a mating coupling 10' of structurally identical design to the electrical contact coupling 10. FIG. 5*b* shows a plan view of the coupling arrangement according to FIG. 5*a*.

It is hereby to be noted that the corresponding components of the mating coupling 10' are identified by the same reference numerals as the components of the electrical contact coupling 10, however wherein a prime symbol has been added to the respective reference numerals for the mating coupling components.

As depicted, in the coupled state, the two contacting supports 40, 40' of the electrical contact coupling 10/mating coupling 10' are respectively displaced forward out of the respective frontal housing opening into the common coupling plane K. This is effected by the corresponding control of the linear drives 50, 50' provided in the coupling housings 11, 11'. The two contacting supports 40, 40' are thus each in their respective second position in which—as described above with reference to the FIG. 3*b* representation—the respective contact tabs 42, 42' of the contacting supports 40, 40' are then in electrical contact with the contacts 32, 32' of the second contact holders 30, 30'.

On the other hand, the frontal end region of contacting support 40 engages into the first contact holder 20 of the mating coupling such that the contacts 22, 22' of the first contact holder 20, 20' are electrically connected to or interconnected with the contacts 32, 32' of the second contact holder 30, 30' of the corresponding mating coupling via the respective contact tabs 42, 42' of the corresponding contacting support 40, 40'.

Further to be noted from the representations provided in FIGS. 5*a* and 5*b* is that the signal transmission terminals 55, 55' centrically arranged with respect to the respective housing frontal area A align up against one another in the coupled state and thus ensure optical and/or electromagnetic signal/data transmission via said signal transmission terminals 55, 55'.

To be noted particularly from the FIG. 5*a* representation is that the electrical contact couplings 10, 10' are each provided with guide rails 14 for guiding the contacting supports 40, 40' in their movement relative to the respective coupling housing 11, 11'. The side edges of the contacting supports 40, 40' hereby engage into the respective guide rails 14.

Then again, the first contact holder 20, 20' also assumes a guiding function and is thus guided due to the sliding of the contacting support 40, 40' associated with said first contact holder 20, 20'.

FIGS. 6*a* and 6*b* depict a further example embodiment of the inventive electrical contact coupling 10, wherein the electrical contact coupling 10 is again in a coupled state. Specifically, the electrical contact coupling 10 according to the further (second) example embodiment is connected to a mating coupling 10' of structurally identical design thereto.

FIG. 6*a* shows a plan view of the coupled electrical contact coupling arrangement, with each coupling housing cover 12 having been removed. FIG. 6*b* is a sectional view along the A-A line in FIG. 6*a*.

The structure and operation of the second example embodiment depicted in FIGS. 6*a* and 6*b* correspond substantially to the structure and operation of the first example embodiment described above, however wherein the second example embodiment makes use of contacting supports 40, 40' of a somewhat longer design compared to the contacting supports employed in the first example embodiment. The respective first and second contact holders 20, 20'; 30, 30' in the second example embodiment are insofar arranged within the respective coupling housing 11, 11' at a greater distance from the common coupling plane K and fixedly connected at that point to said coupling housing 11, 11'. Apart from that, the structure of the second example embodiment corresponds to the structure of the first example embodiment described above. To avoid repetition, reference is thus made at this point to the previous remarks.

FIG. 7*a* is a perspective view of a further (third) example embodiment of the inventive electrical contact coupling 10, wherein this time the electrical contact coupling 10 is shown with coupling housing cover 12. The electrical contact coupling 10 in the representation according to FIG. 7*a* is furthermore coupled to a corresponding mating coupling 10' of structurally identical design.

FIG. 7*b* shows a plan view of the coupling arrangement according to FIG. 7*a* while FIG. 7*c* shows the coupling arrangement according to FIG. 7*a* in a state in which the respective coupling housing covers 12, 12' of electrical contact coupling 10 and mating coupling 10' have been removed. FIG. 7*d* shows the coupling arrangement according to FIG. 7*c* in plan view.

The third example embodiment of the inventive electrical contact coupling 10 corresponds substantially to the first example embodiment described above, however wherein the third embodiment provides for additional centering members on the respective coupling housings 11, 11' of electrical contact coupling 10 and mating coupling 10'. The centering members employed in the third example embodiment of the inventive solution are designed as a centering pin 65 and centering sleeve 66 and serve in the self-centering of the two electrical contact couplings 10, 10' when they near each other during the coupling process. Naturally, the centering members (centering pin 65; centering sleeve 66) can also be arranged at other positions. Other embodiments for the centering members are moreover also conceivable.

FIG. 10*a* is a plan view of a further (fourth) example embodiment of the inventive electrical contact coupling 10, wherein the electrical contact coupling 10 again exhibits no coupling housing cover 12. FIG. 10*b* further shows the electrical contact coupling 10 according to the fourth example embodiment in a perspective view, wherein the electrical contact coupling 10 is hereby coupled to a corresponding mating coupling 10' of structurally identical design in accordance with the fourth embodiment. Lastly, FIG. 10*c* shows a plan view of a coupling arrangement according to FIG. 10*b*. The coupling housing covers 12/12' are also absent in FIGS. 10*b* and 10*c* in order to illustrate the structure of the electrical contact coupling 10/10'.

The fourth example embodiment of the inventive electrical contact coupling 10 corresponds substantially to the first through third embodiments described above, however wherein the second contact holder 30, of structurally identical design to the first contact holder 20 and particularly visible in FIG. 2*a*, has been omitted in the fourth embodiment.

Hence, the electrical contact coupling 10 according to the fourth embodiment of the present invention also comprises a coupling housing 11 in which all the components of the electrical contact coupling 10 are accommodated. In detail, a first contact holder 20 is arranged in a first half of said coupling housing 11 of the electrical contact coupling depicted in FIGS. 10*a* to 10*c*. A second contact holder is arranged in the opposite second coupling housing half, in particular configured as rear end region 42*a* of the at least one contact tab 42. The second contact holder according to this fourth embodiment is thus arranged directly on the contacting support 40, whereby no separate second contact holder (e.g. 30, FIG. 2*a*) is needed.

It is thereby necessary to modify the configuration of the plate-shaped contacting support 40. Such a second example embodiment of the plate-shaped contacting support 40 is shown in FIGS. 11a and 11b. In detail, FIG. 11a is a perspective view of the second example embodiment of the plate-shaped contacting support 40 while FIG. 9b shows a plan view of the contacting support 40.

The plate-shaped contacting support 40 according to this second embodiment comprises a (plate-shaped) base body 41 of an electrically non-conductive insulating material, whereby at least one and preferably a plurality of adjacently configured contact tabs 42 extending in the longitudinal direction L of the contacting support 40 are additionally provided. As noted above, the contact tabs 42 are formed from an electrically conductive material and serve to interconnect the electrical contacts of the second contact holder with the corresponding electrical contacts of a mating coupling of preferably structurally identical design to electrical contact coupling 10.

The contact tabs 42 are preferably at least partially embedded (integrated) into the insulating material of the base body 41 to prevent the contact tabs 42 from being damaged when the plate-shaped contacting support 40 is displaced relative to the coupling housing 11 from its first position, in which the contacting support 40 is fully accommodated in the coupling housing 11, into its second position, in which at least the frontal end region of the contacting support 40 protrudes from the corresponding housing opening 33 of the coupling housing 11.

In particular, the contact tabs 42 are preferably exposed at the front as well as the rear end region of the contacting support 40. The contact tabs 42 thus exhibit an exposed rear end region 42a as well as an exposed frontal end region 42b. The rear end region 42a of the contact tabs 42 is thereby configured as the second contact holder and accordingly comprises at least one and preferably a plurality of adjacently arranged electrical contacts 32a. The individual adjacently arranged electrical contacts 32a are electrically insulated from one another and are designed to each be electrically connected to a respective data or signal line. The data/signal lines are not shown in FIGS. 10a to 11b in the interest of clarity. It is however self-explanatory that the data/signal lines according to the fourth embodiment can be connected to e.g. the respective end regions of the electrical contacts 22, 32 of contact holder 30, particularly by soldering. Thus, according to the fourth embodiment, a separate second contact holder (e.g. 30, FIG. 2a) can be omitted, whereby the number of wearing parts is further reduced.

As can be seen from FIGS. 10b and 10c, it is therefore only necessary for the exposed frontal end region 42b, 42b' of the respective contact tabs 42, 42' to be brought into connection with the electrical contacts 22, 22' of the respective first contact holder 20, 20' in order to establish contact with identically structured electrical contact coupling 10'. The contacting of the frontal end regions 42b, 42b' of the contact tabs 42, 42' arranged at the frontal end region of the contacting support 40 with the contacts 22, 22' of the first contact holder 20, 20' preferably ensues identically to that as described above with respect to the first three embodiments.

According to a further embodiment, rear end regions 42a, 42a' of the respective contact tabs 42, 42' can be configured on the contacting support 40 designed as a flexible circuit board. In this case, the contacting of the rear end regions 42a, 42a' and the contacts 32, 32' of the contact holder 30, 30' ensues by a pretensioning of the circuit board pressing the circuit board forming the contacting support 40 against the electrical contacts 32, 32', wherein this only occurs on one side of the circuit board. Pretensioning the flexible circuit board ensures that the circuit board will be pressed against contacts 32, 32' at a certain (predefined or predefinable) pressing force to thereby enable reliable transmission of data, signals and/or electric current.

A flexible circuit board of this type is designed to reduce the mechanical load on the contact tabs 42, 42' as well as on the electrical contacts 32, 32' since the contacts 32, 32' make solid contact with the contact holder 40 within a certain range of spatial tolerance without said tolerance allowing any significant mechanical stressing of the flexible circuit board, the contact tabs 42, 42' or the electrical contacts 32, 32'.

FIG. 17 shows the case of the contacting support 40 being disposed in the first position of the electrical contact coupling in which there is no coupling to a respective mating coupling 10' such that the contact tabs 42 in the frontal end region of the contacting support 40 are not in contact with electrical contacts 32. This means that the front contact tabs 42 of the contacting support 40 are not subjected to twice as many cycles as the contact tabs 42 in the rear region of the contacting support 40 (when the electrical coupling 10 couples to a mating coupling 10'), which would be the case if the front contact tabs 42 were drawn back to contacts 32.

As FIG. 18 shows, it is conceivable for the contact tabs 42, 42' to comprise elastic elements 42.2 which establish contact with electrical contacts 22, 22', 32, 32' in a coupled state of the electrical contact coupling 10 and a corresponding mating coupling 10'.

The elastic elements 42.2 are designed such that electrical contact is established between the contact tabs 42, 42' and the electrical contacts 22, 22', 32, 32' when the contact tabs 42 are moved out of the coupling housing 11 of the electrical contact coupling 10 by means of the contacting support 40 and pushed toward a corresponding mating coupling 10'.

FIG. 12a shows a perspective view of a mechanical coupler head 70 of a track-borne vehicle equipped with an example embodiment of the inventive electrical contact coupling 10. Specifically, FIG. 10a shows the electrical contact coupling 10 in its non-coupling-ready state; i.e. in a state in which the plate-shaped contacting support 40 of the electrical contact coupling 10 is completely accommodated within the coupling housing 11 of the contact coupling 10 (first position of the contacting support 40).

FIG. 12b shows the (mechanical) coupler head 70 of the automatic central buffer coupling with the electrical contact coupling 10 of FIG. 12a affixed thereto, however wherein the electrical contact coupling 10 here is in its coupling-ready state; i.e. in a state in which the plate-shaped contacting support 40 of the electrical contact coupling 10 at least partly protrudes from the coupling housing 11 of the electrical contact coupling 10 and into the common vertical coupling plane K.

The mechanical coupler head 70 according to the representations provided in FIGS. 12a and 12b is a coupler head for an automatic central buffer coupling of Scharfenberg® type. This mechanical coupler head, which is generally identified by reference numeral "70", essentially comprises a coupler head housing 71 as well as a face plate 72 terminating the coupler head housing 71 at its front. The face plate 72 is detachably connected to the coupler head housing 71 of the mechanical coupler head 70 by means of screws 73. The coupler lock as well as the uncoupling cylinder are accommodated in the coupler head housing 71.

All the design features related to the specific type of coupler head are preferably arranged on the face plate 72 of the mechanical coupler head 70, whereby this refers to all the essential structural features common to the type of coupler head and which characterize the coupler head type's mode of operation. For example, the set gripping range (via the gripper 76) or the size and/or form of the funnel 75 and cone 74 are each one such design feature related to the specific type of coupler head since these features characterize the locking of the coupler head 70.

Essential to the present invention is for the electrical contact coupling 10 to be fixedly connected; i.e. rigidly, to the mechanical coupler head 70, and particularly to the coupler head housing 71 of the mechanical coupler head 70. This can for example be effected—as shown in the example embodiment according to FIG. 12—by the electrical contact coupling 10 being fixedly connected to the mechanical coupler head 70 atop said mechanical coupler head 70. It is however of course also conceivable for the electrical contact coupling 10 to be arranged at the side of the mechanical coupler head 70 or beneath the mechanical coupler head 70. Also conceivable is arranging a plurality of electrical contact couplings 10 on one mechanical coupler head 70, for example both at the side and atop or beneath said mechanical coupler head 70. What all the different configurations have in common is that the coupling housing 11 of the electrical contact coupling 10 is fixedly; i.e. rigidly, connected to the mechanical coupler head 70. In particular, it is no longer necessary for the coupling housing 11 of the electrical contact coupling 10 to move relative to the mechanical coupler head 70, as is absolutely mandatory in the solutions known from the prior art.

As can be noted particularly from the representation in FIG. 12*b*, the electrical contact coupling 10 is connected to the mechanical coupler head 70 such that the housing frontal area A of the electrical contact coupling 10 is flush with the face plate 72 of the mechanical coupler head 70 so as to lie in the common vertical coupling plane K of the mechanical coupler head 70.

Naturally, it is however of course also conceivable for the electrical contact coupling 10 is to be arranged at a slight offset to the rear.

FIG. 13 is a perspective view of the mechanical coupler head 70 of FIG. 12*b*, wherein the mechanical coupler head 70 together with the electrical contact coupling 10 connected to the mechanical coupler head 70 is connected (coupled) to a mechanical coupler head 70' of correspondingly structurally identical design. It is particularly evident from the FIG. 13 depiction that the coupling housing 11 of the electrical contact coupling 10 has only very minimal overall height; it is thus a very compact structure which requires only very little installation space.

FIG. 14 is a perspective view of a further example embodiment of a mechanical coupler head 70 which is particularly suited for use with an electrical contact coupling 10 in accordance with the present invention. In contrast to the mechanical coupler head according to FIG. 12*a*, the mechanical coupler head 70 according to FIG. 14 is provided with a face plate 72 which projects over the front area of the coupler head housing 71 of the mechanical coupler head 70 at the upper region and provides the slot-like opening (housing openings 23, 33) for an electrical contact coupling 10 to be connected to the mechanical coupler head 70.

FIG. 15 shows a perspective view of the mechanical coupler head 70 as depicted in FIG. 14, wherein in this view, an example embodiment of the inventive electrical contact coupling 10 is connected to the mechanical coupler head 70. In this embodiment, it is for example conceivable for the (rigid) connection between the electrical contact coupling 10 and the mechanical coupler head 70 to be made via the face plate 72 of the mechanical coupler head 70. The face plate 72 of the mechanical coupler head 70 defining the slot-like opening (frontal housing openings 23, 33) of the electrical contact coupling 10 ensures that the housing frontal area A of the electrical contact coupling is flush with the face plate 72 of the mechanical coupler head and lies in common vertical coupling plane K.

The invention is not limited to the embodiments depicted as examples in the drawings but rather yields from a consideration of all the features disclosed herein in context.

The invention is particularly characterized by the provision of an electrical contact coupling 10 which no longer moves during the coupling process relative to a mechanical coupler head 70 to which the electrical contact coupling 10 is rigidly connected.

The invention is furthermore characterized by the provision of the plate-shaped contacting support 40 having the corresponding contact tabs 42. Doing so renders it possible for the cables carrying current/data no longer needing to be moved relative to the electrical contact coupling 10 when said electrical contact coupling 10 is being coupled, thereby considerably reducing mechanical wear on the cables.

In addition, the entire mechanism needed for the electrical coupling process can be integrated into the coupling housing 11 of the electrical contact coupling 10. The contact tabs 42 of the contacting support 40 travel into the mating coupling 10' during the electrical coupling and close the contact between the respective contact holders of the two electrical contact couplings via sliding or slide contacts.

In the uncoupled state, the frontal housing opening 23/33 provided in the housing frontal area A of the coupling housing 11 of the electrical contact coupling 10 is closed by a mechanical flap, a brush curtain or a flexible seal in order to prevent the current/data-carrying cables from coming into contact with other objects or living beings and/or being contaminated by contaminants.

In the coupled state, the electrical contact coupling is circumferentially sealed by one or more seals so that impermeability is also guaranteed during relative movements of the mechanical coupling. After mechanically coupling, the electrical contact coupling moves into the mating coupling. The mating coupling is provided with a contact strip in the form of a contact holder equipped with sliding or slide contacts. The contacting support 40 with the contact tabs 42 of the electrical contact coupling travels into the mating coupling until the sliding/slide contacts of the mating coupling close the electrical contact with the contact tabs of the contacting support 40.

The electrical contact coupling 10 can be mechanically uncoupled from the mechanical coupling, or mechanical coupler head 70 respectively, via damping/spring elements. This is due to the relative motion of the mechanical coupling not being transmitted to the electrical contact coupling where applicable. To compensate for relative motion from the electrical contact coupling 10 to the mechanical coupling or the mechanical coupler head 70, the contacting support 40 of the electrical contact coupling 10 can also be designed such that said contacting support 40 can participate in the necessitated relative movements.

On the other hand, the electrical contact coupling 10 can also be connected to the mechanical coupler head 70 by means of spring or suspension mounting. This type of mounting of the electrical contact coupling 10 particularly prevents the movements of the mechanical coupler head 70, particularly vibrational motion, from being transmitted to the electrical contact coupling 10, which thereby prevents the electrical contact coupling 10 from being subjected to further wear. Also ensured is being able to securely couple the electrical contact coupling 10 to a mating coupling 10' of preferably structurally identical design to electrical contact coupling 10 and not subjecting the elements of the coupling to increased wear during such coupling.

The contacting support 40 comprises the contact tabs 42, and namely either on the upper or lower side. The base body 41 of the plate-shaped contacting support 40 is composed of an electrically insulating material. The centers of the contact tabs 42 can be completely embedded in the insulating material of the base body 41 such that the tab contacts only protrude in the area of the sliding or slide contacts. It is hereby also conceivable for the contact tabs 42 to be configured thinner at their centers in order to reduce excessive wear on the sliding contacts during the electrical coupling.

It is particularly preferentially provided for the electrical contact coupling 10 to be of overall modular design so that the contact holder, the plate-shaped contacting support as well as further structural components can be quickly replaced upon removing the coupling housing cover.

The electrical contact coupling 10 according to the present invention can be affixed on the side and/or atop/beneath a mechanical coupler head 70.

LIST OF REFERENCE NUMERALS

10 electrical contact coupling
10' mating coupling
11 coupling housing
12 coupling housing cover
13 (upper) housing opening
14 guide rails
20 first contact holder
21 supporting substrate
22 electrical contact
23 frontal housing opening
30 second contact holder
31 supporting substrate
32 electrical contact
33 frontal housing opening
40 plate-shaped contacting support
41 contacting support base body
42 contact tabs of contacting support
42.1 slot for the contact tabs
42.2 elastic elements
42*a* rear end region of contact tabs
42*b* front end region of contact tabs
50 linear drive
55 signal transmission terminal
60 sealing arrangement
65 centering pin
66 centering sleeve
70 mechanical coupler head
71 coupler head housing
72 face plate
73 screws
74 cone
75 funnel
76 gripper
100 electrical contact coupling (prior art)
101 coupling housing (prior art)
102 contact holder (prior art)
103 pin contact (prior art)
104 flap (prior art)
105 guide (prior art)
106 centering element (prior art)
S vertical axis of reflection
A housing frontal area of the electrical contact coupling
K common coupling plane
L longitudinal direction of contacting support

What is claimed is:

1. An electrical contact coupling for a track-borne vehicle, particularly a railway vehicle, wherein the electrical contact coupling comprises the following:

a coupling housing having at least one frontal housing opening;

a first contact holder arranged in said coupling housing having at least one and preferably a plurality of particularly adjacently arranged electrical contacts; and a preferably plate-shaped contacting support having at least one and preferably a plurality of particularly adjacently formed contact tabs extending in a longitudinal direction of said contacting support, wherein the contacting support is displaceable in the longitudinal direction of the coupling housing relative to said coupling housing from a first position, in which the contacting support with the at least one contact tab is completely accommodated within the coupling housing, into a second position and vice versa, wherein at least a front end region of the contacting support protrudes from the at least one frontal housing opening of the coupling housing in the second position to form an electrical contact between the at least one contact tab and at least one electrical contact of a mating coupling of preferably structurally identical design to the electrical contact coupling.

2. The electrical contact coupling according to claim 1, wherein the first contact holder is configured as a receiving member and is designed to receive at least the front end region of the contacting support of a preferably structural identical mating coupling to electrical contact coupling when the electrical contact coupling is coupled to the mating coupling and the contacting support of the mating coupling is in its second position.

3. The electrical contact coupling according to claim 1, wherein the first contact holder is preferably detachably and replaceably connected to the housing of the electrical contact coupling, and wherein the at least one electrical contact of the first contact holder is designed as an electrical sliding or slide contact to which an electrical data or signal line of the electrical contact coupling can be connected.

4. The electrical contact coupling according to claim 1, wherein the electrical contact coupling further comprises a second contact holder arranged in the coupling housing having at least one and preferably a plurality of particularly adjacently arranged electrical contacts, wherein the second contact holder is designed as the end region of the at least one contact tab.

5. The electrical contact coupling according to claim 1, wherein the electrical contact coupling further comprises a second contact holder arranged in the coupling housing having at least one and preferably a plurality of particularly adjacently arranged electrical contacts, wherein the contacting support is designed to electrically interconnect the at least one electrical contact of the second contact holder to at least one electrical contact of the mating coupling of preferably identical structural design to electrical contact coupling.

6. The electrical contact coupling according to claim 5, wherein the first and second contact holder are in a symmetrical arrangement to a vertical axis of reflection of a housing frontal area of the electrical contact coupling.

7. The electrical contact coupling according to claim 5, wherein the second contact holder is attached to the contacting support of the electrical contact coupling and designed as a guide for guiding the contacting support in movement relative to the housing of the electrical contact coupling.

8. The electrical contact coupling according to claim 5, wherein the second contact holder is preferably detachably and replaceably connected to the housing of the electrical contact coupling, and wherein the at least one electrical contact of the second contact holder is designed as an electrical sliding or slide contact to which an electrical data or signal line of the electrical contact coupling can be connected.

9. The electrical contact coupling according to claim 1, wherein at least one sealing arrangement is provided to seal the at least one frontal housing opening provided in the coupling housing particularly in the first position of the contacting support, wherein said sealing arrangement is preferably a leaf seal, pressure seal, brush seal and/or a mechanical flap.

10. The electrical contact coupling according to claim 1, wherein the contacting support is formed from an electrically non-conductive insulating material, and wherein the at least one contact tab extending in the longitudinal direction of the contacting support is accommodated in the insulating material such that preferably only two end regions of the at least one contact tab are at least partly exposed and form corresponding electrical contact areas.

11. The electrical contact coupling according to claim 1, wherein the electrical contact coupling further comprises a drive, particularly a linear drive and preferably a pneumatic, hydraulic or electrically powered drive, which is preferably accommodated in the housing of the electrical contact coupling for displacing the contacting support relative to the housing of the electrical contact coupling as needed.

12. The electrical contact coupling according to claim 1, wherein the electrical contact coupling further comprises at least one optical and/or electromagnetic signal transmission terminal arranged on a vertical axis of reflection of a housing frontal area of the electrical contact coupling or arranged at the housing frontal area of the electrical contact coupling at an offset to the vertical axis of reflection.

13. The electrical contact coupling according to claim 1, wherein the electrical contact coupling comprises at least one centering element for self-centering of the electrical contact coupling when nearing the mating coupling of preferably identical structural design to the electrical contact coupling.

14. The electrical contact coupling according to claim 1, wherein the contacting support is designed as a flexible circuit board in at least one area opposite from the front end region of the contacting support.

15. The electrical contact coupling according to claim 1, wherein the contact tabs in the front end region of the contacting support do not contact the electrical contacts in the first position of the contacting support.

16. The electrical contact coupling according to claim 1, wherein at least the contact tabs in the front end region of the contacting support, preferably also the contact tabs in the area of the contacting support opposite from the front end region, are designed as elastic elements to allow sliding or slide contact with at least one electrical contact of the mating coupling of preferably identical structure to the electrical contact coupling and/or the contacts.

17. A coupler head for a track-borne vehicle, particularly a coupler head of an automatic central buffer coupling, wherein the coupler head comprises the following:

a coupler head housing;

a face plate terminating a front end of the coupler head housing; and at least one electrical contact coupling, wherein a coupling housing of the at least one electrical contact coupling is preferably fixedly connected to the coupler head housing of the coupler head such that a frontal area of the coupling housing is in or is in direct proximity to a vertical coupling plane of the coupler head.

18. The coupler head according to claim 17, wherein at least part of the face plate of the coupler head housing protrudes over the frontal area of the coupler head housing and forms a face plate for the at least one electrical contact coupling affixed to the coupling housing, wherein the face plate of the coupler head housing includes at least one slot-like opening in the area protruding over the front end of the coupler head housing through which at least part of a contacting support of the at least one electrical contact coupling affixed to the coupler head housing can extend.

19. The coupler head according to claim 17, wherein the at least one electrical contact coupling is connected to the coupler head housing of the coupler head such that electrical contact coupling is spring-mounted or suspended relative to the coupler head housing and the coupler head.

20. The coupler head according to claim 18, wherein the at least one electrical contact coupling is connected to the coupler head housing of the coupler head such that the electrical contact coupling is spring-mounted or suspended relative to the coupler head housing and the coupler head.

* * * * *

UNITED STATES PATENT AND TRADEMARK OFFICE

CERTIFICATE OF CORRECTION

PATENT NO. : 9,555,820 B2
APPLICATION NO. : 14/910728
DATED : January 31, 2017
INVENTOR(S) : Sascha Ende et al.

It is certified that error appears in the above-identified patent and that said Letters Patent is hereby corrected as shown below:

In the Specification

Column 8, Line 4 reads:
FIGS. 1*a* 1*b*, and 1*c*: are perspective views of a conven-
Should read:
FIGS. 1*a*, 1*b*, and 1*c*: are perspective views of a conven- In the Claims Claim 19, Column 24, Line 44 reads:
head such that electrical contact coupling is spring-
Should read:
head such that the electrical contact coupling is spring- Signed and Sealed this
Eighth Day of August, 2017

Joseph Matal

Joseph Matal
*Performing the Functions and Duties of the*
*Under Secretary of Commerce for Intellectual Property and*
*Director of the United States Patent and Trademark Office*